Oct. 17, 1933.  H. S. PYM ET AL  1,930,487
MACHINE FOR EFFECTING RELATIVE MOVEMENT OF SHOES AND LASTS
Filed Feb. 29, 1932   9 Sheets-Sheet 1

INVENTORS
Harold S. Pym
John M. Whelton
By their Attorney
Harlow B. Davis

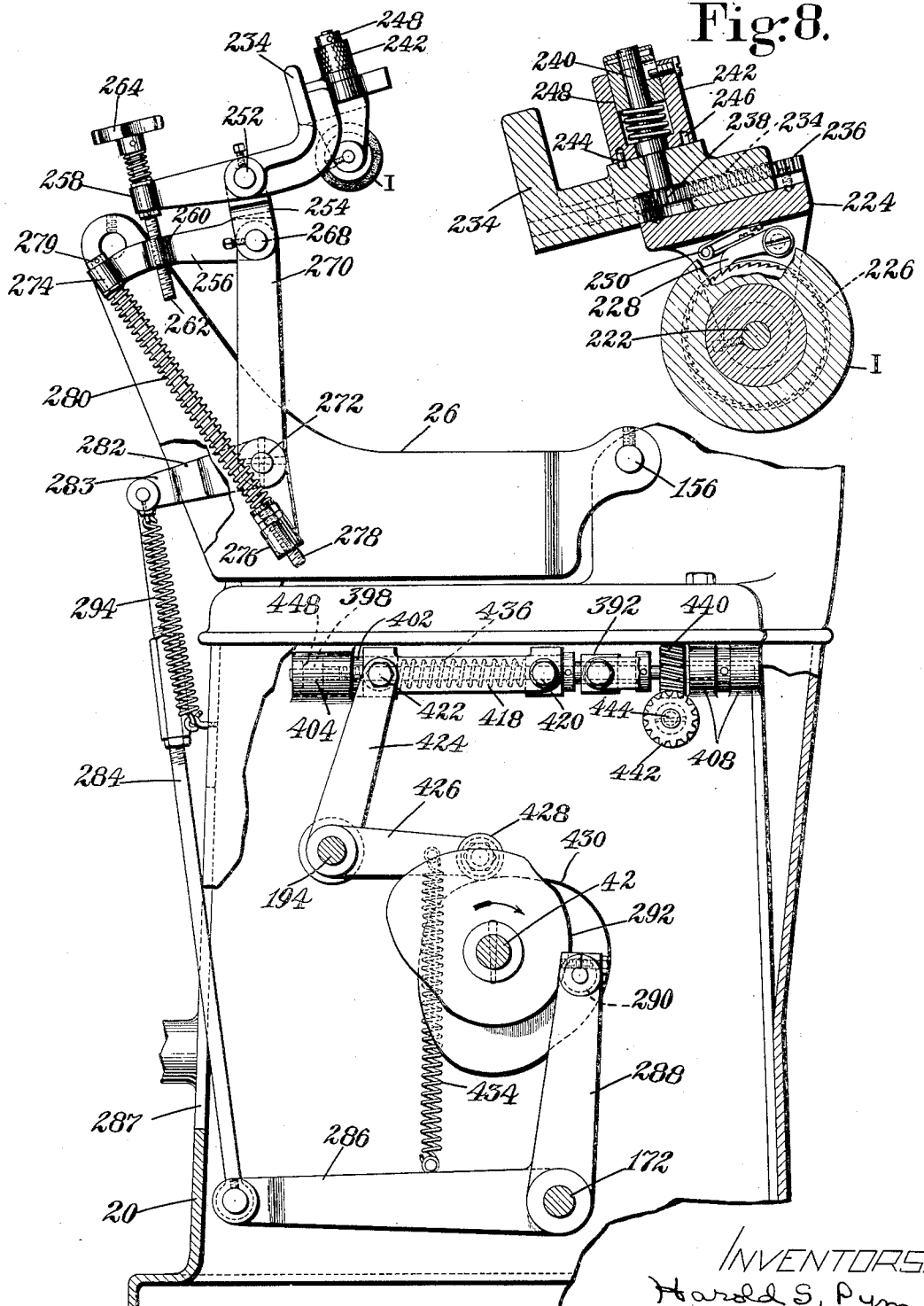

Oct. 17, 1933.   H. S. PYM ET AL   1,930,487
MACHINE FOR EFFECTING RELATIVE MOVEMENT OF SHOES AND LASTS
Filed Feb. 29, 1932   9 Sheets-Sheet 7
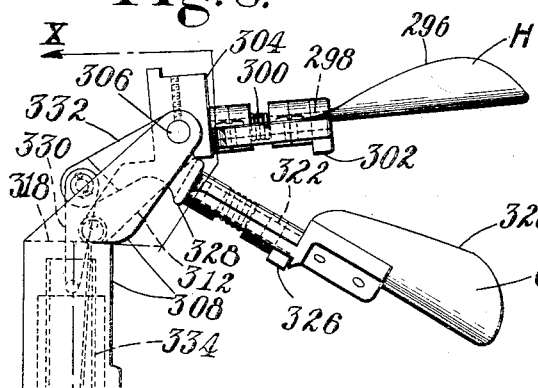
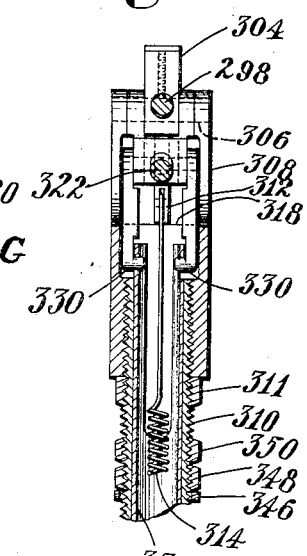
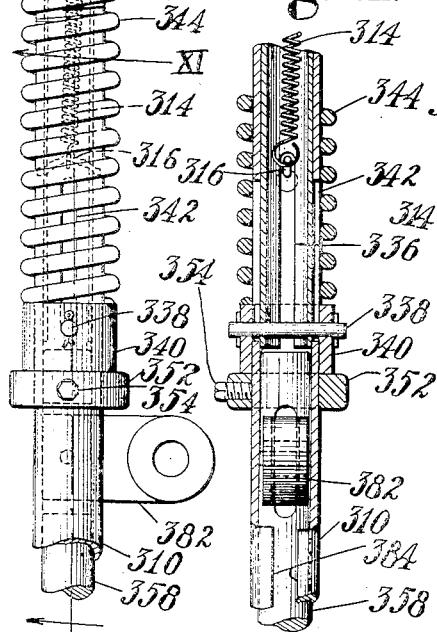
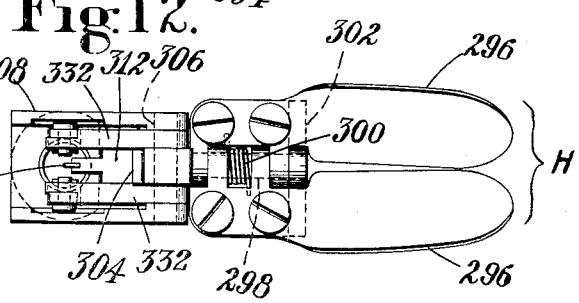
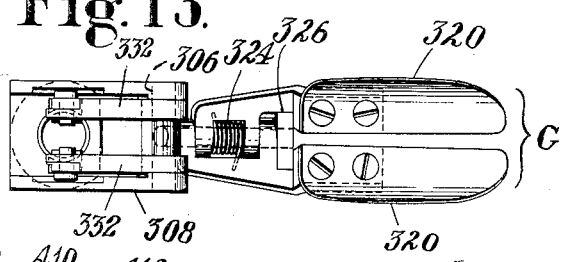
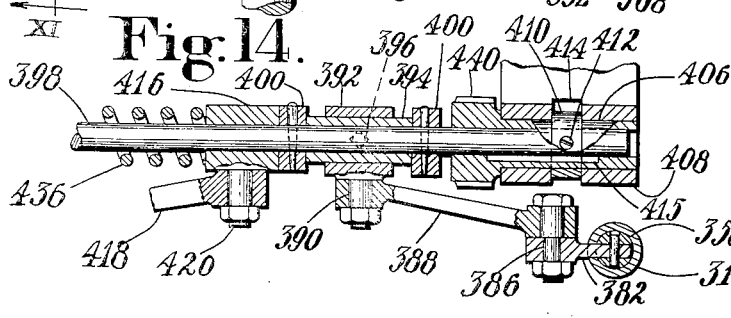

Oct. 17, 1933.  H. S. PYM ET AL  1,930,487
MACHINE FOR EFFECTING RELATIVE MOVEMENT OF SHOES AND LASTS
Filed Feb. 29, 1932  9 Sheets-Sheet 8

INVENTORS
Harold S. Pym
John M. Whelton
By their Attorney
Harlow M. Davis

Oct. 17, 1933.  H. S. PYM ET AL  1,930,487
MACHINE FOR EFFECTING RELATIVE MOVEMENT OF SHOES AND LASTS
Filed Feb. 29, 1932   9 Sheets-Sheet 9

INVENTORS
Harold S. Pym
John M. Whelton
By their Attorney
Harlow M. Davis

Patented Oct. 17, 1933

1,930,487

UNITED STATES PATENT OFFICE 1,930,487

MACHINE FOR EFFECTING RELATIVE MOVEMENT OF SHOES AND LASTS

Harold S. Pym, Beverly, and John M. Whelton, Peabody, Mass., assignors to United Shoe Machinery Corporation, Paterson, N. J., a corporation of New Jersey Application February 29, 1932. Serial No. 595,810

55 Claims. (Cl. 12—15)

This invention relates to machines for effecting relative movement of shoes and lasts and is herein illustrated as embodied in a relasting machine. In certain of its aspects, however, the invention is not limited to use in connection with relasting machines but may be utilized in machines for other purposes, for example machines for separating shoes from their lasts.

Machines for moving shoes relatively to their lasts, wherein the shoe-moving element consists of a driven friction roll, have already been devised. A relasting machine of the roll type which has proved successful in operations upon shoes having soles of leather or other relatively solid material, is disclosed in the application of Arthur F. Pym, Serial No. 124,664, filed July 24, 1926. In that machine a friction roll, which is rotated while in engagement under heavy pressure with the sole of a shoe, urges the shoe rearwardly upon a last and thus cooperates with a horn mechanism to seat the shoe upon the last.

An object of the present invention is to provide an improved machine for effecting relative movement of shoes and lasts, in which machine the frictional shoe-moving means engages the shoe over a considerably greater area than in the case of machines of the roll type. The improved machine, by reason of the fact that it distributes the shoe moving force over a greater portion of the surface of a sole, can be used advantageously in operations upon shoes having soles composed of relatively soft and pliable material, for example upon comfort slippers having soft felt-padded soles, as well as upon shoes having more solid soles. In accordance, therefore, with one feature of the invention, the illustrated machine is provided with a member which is frictionally engageable with the bottom of a shoe on a supported last, which friction member is operated by means constructed and arranged to press it against the shoe bottom and to move it bodily lengthwise of the last and in frictional engagement with the shoe bottom to move the shoe relatively to the last. The friction member may, as in the illustrated machine, consist of a pad composed of deformable material, for example, rubber, and a rigid backing may be provided for the pad which rigid backing may be pivotally connected to the operating means to enable the pad to tilt to accommodate the inclination of the shoe bottom. In the illustrated machine the friction pad has an operating surface of sufficient extent to engage the forepart of a shoe bottom from the toe end of the shoe to the ball line.

In accordance with another feature, there is provided a friction member constructed and arranged, under the influence of a spring, to be pressed yieldingly against the instep of a shoe, and there is also provided means for moving the instep-engaging member in a direction having a component lengthwise of the last to cause the member to exert a frictional force tending to move the shoe relatively to the last. The illustrated friction member consists of a roll rotatably mounted upon a support and held against rotation during its operative movement, the holding means being automatically releasable upon retraction of the roll support to permit the roll to rotate during its return movement, thereby avoiding any tendency of the roll to move the shoe in the direction of the return movement.

In accordance with a further feature the machine is provided with three members constructed and arranged to engage three separated portions respectively of the shoe and to exert forces tending to seat the shoe upon the last together with means constructed and arranged to operate each of the shoe engaging members in timed relation to the others to cause all of the shoe engaging members to cooperate in seating the shoe upon the last. In the illustrated machine the three members consist of means frictionally engageable with the upper of the forepart of the shoe, such as the friction roll above referred to, means frictionally engageable with the bottom of the shoe such as the deformable bottom-engageable member above referred to, and a device for drawing the heel portion of the shoe upon the last illustrated herein as a movable shoe horn and a cooperating gripper member adapted to engage the upper of the heel portion of the shoe.

The above and other features of the invention, including details of construction and the arrangement of parts, will now be more particularly described with reference to the accompanying drawings, in which Fig. 1 is a view in side elevation of a machine embodying the invention;

Fig. 7 is an elevational view similar to Fig. 2, but showing the base of the machine in section and omitting certain portions shown in Fig. 4;

Fig. 8 is a sectional view in side elevation of the instep pad and its support;

Fig. 9 is a view in side elevation of the horn and its cooperating gripper member, together with their support;

Fig. 10 is a sectional view taken on the line X—X of Fig. 9;

Fig. 11 is a sectional view taken on the line XI—XI of Fig. 9;

Fig. 12 is a plan view of the horn;

Fig. 13 is a plan view of the gripper;

Fig. 14 is a sectional view of a portion of the horn operating mechanism;

Fig. 15 is a view in end elevation of a portion of the mechanism for operating the shoe bottom engaging member;

Figure 16:
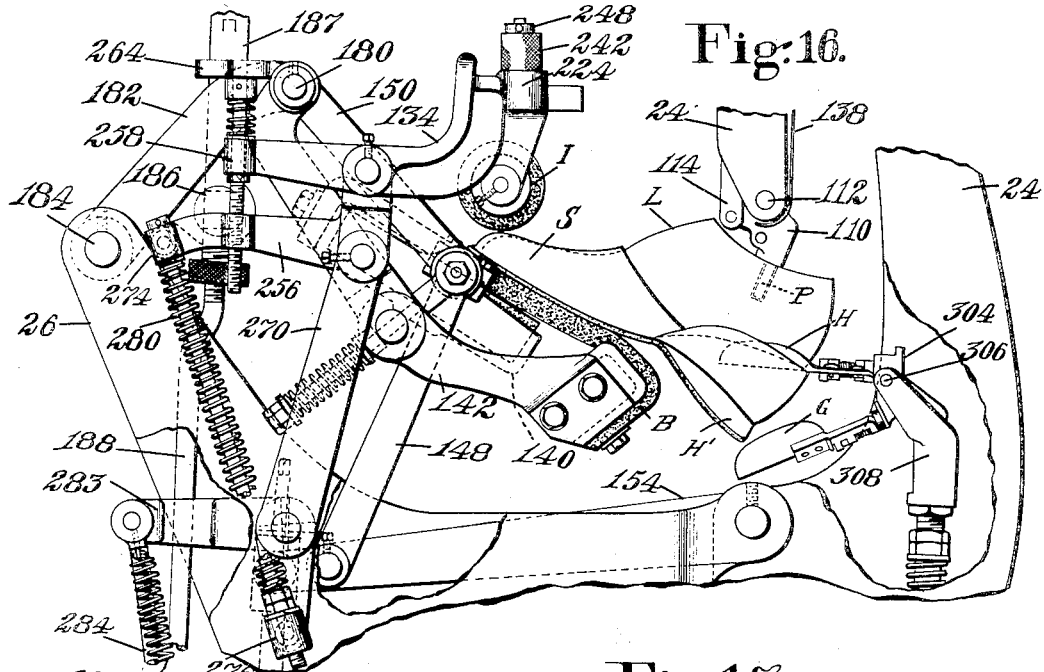
Figure 17:
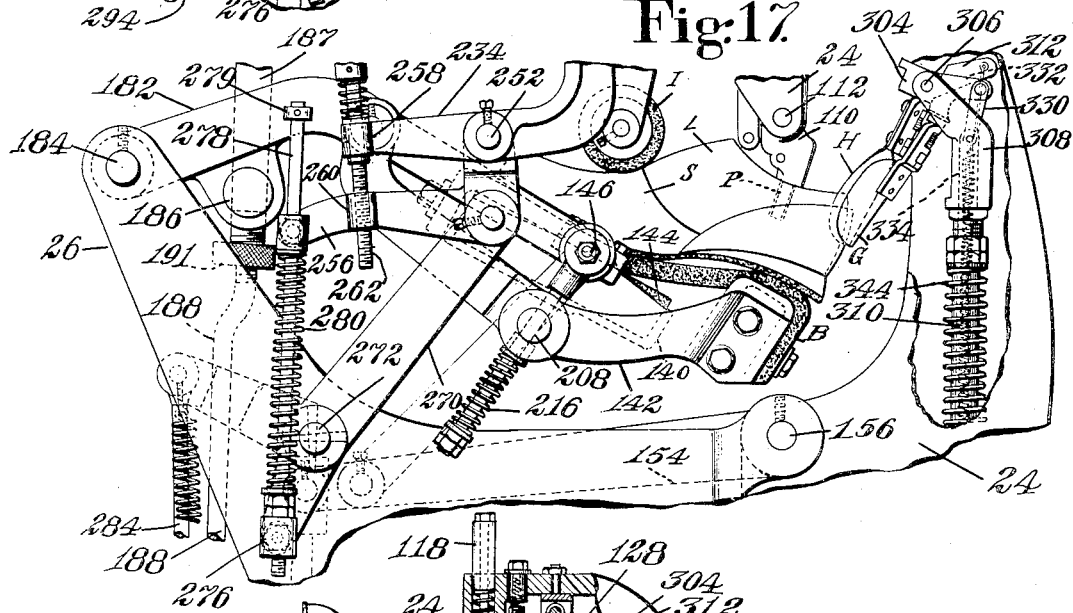
Figure 18:
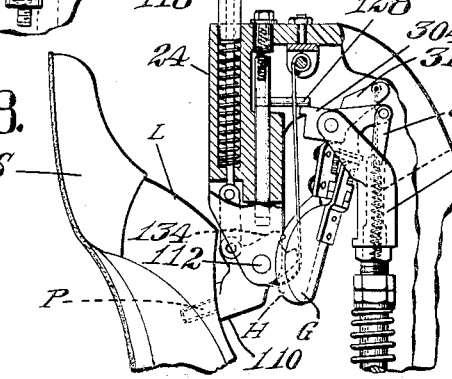
Figure 19:
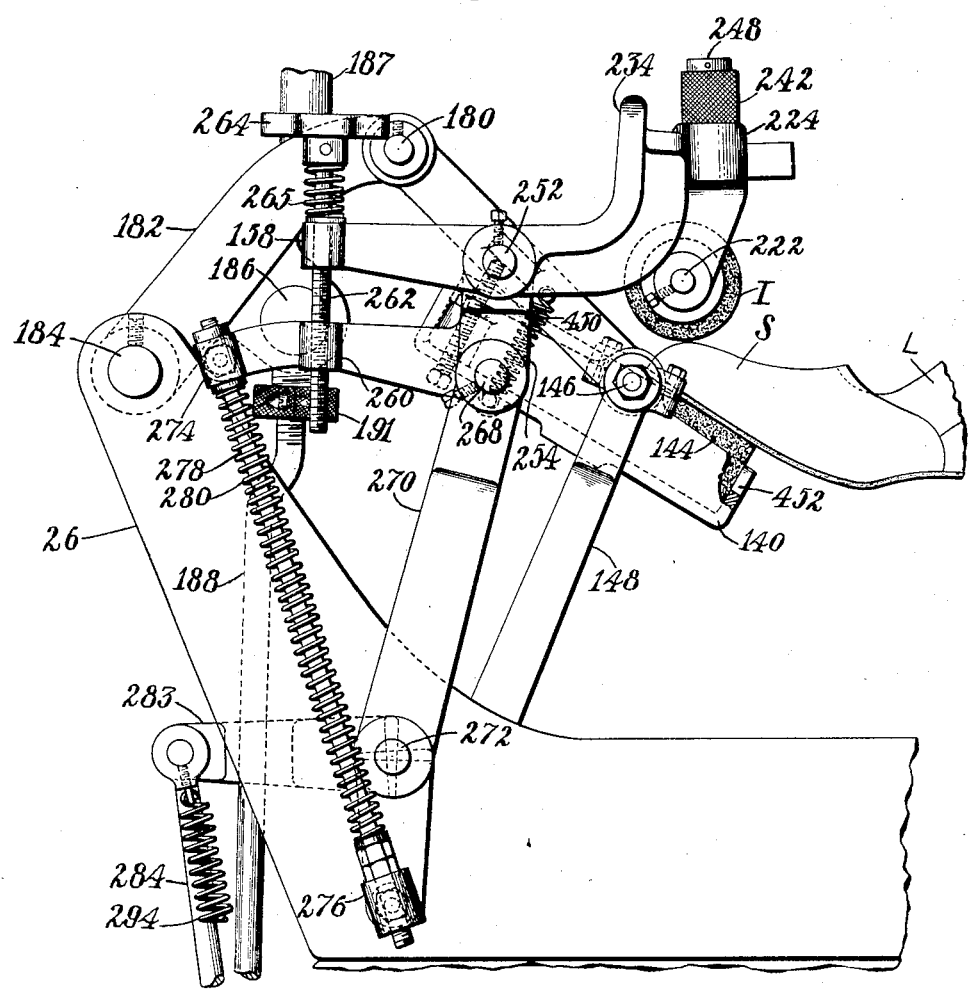

Figs. 16, 17, and 18 are views in side elevation showing progressive positions of the shoe engaging members; and Fig. 19 is a view in side elevation showing a modified form of the shoe bottom engaging member.

In the drawings, L designates a last and S designates a shoe which is being mounted on the last. The shoe S, as herein illustrated, is a comfort slipper having a soft sole extending from the toe end to the heel end. The sole has a thin leather cover cushioned by an inner layer of felt, an additional thickness of felt being provided to fill a padded heel portion H'. The upper of the shoe S is composed of pliable leather, and the usual counter at the heel end is omitted, leaving this portion of the upper soft.

The illustrated relasting machine is provided with instrumentalities for mounting a shoe on a last comprising a friction member B which is engageable with the bottom of the shoe, a friction member I which is engageable with the upper of the forepart of the shoe, and a shoe horn H. The member I of the illustrated machine acts upon the instep of the shoe and will hereinafter be termed the instep pad. While these instrumentalities will later be described in detail, it is sufficient for the present to point out that the shoe bottom engageable member B consists of a rubber pad or blanket, while the instep pad I consists of a block of rubber which, while in the form of a roll, does not rotate in the course of its operative movement. The pad member I is permitted, however, to rotate while being retracted in order to avoid any tendency to withdraw the shoe with it. The horn H is provided with a cooperating gripper member G which engages the outside of the rear end of the shoe upper. The last L is mounted upon a last pin P which is securely latched in a convenient operating position during the relasting operation. The shoe S is first partially drawn over the last L by hand after which it is mounted upon the last by the above-mentioned operating instrumentalities. These instrumentalities are driven, in the illustrated machine, by a cyclically-controlled mechanism which is started by the depression of a treadle T by the operator. This mechanism operates first to bring the bottom engageable member B into yielding contact under heavy pressure with the bottom of the shoe S and also to bring the instep pad I almost into engagement with the upper at the forepart of the shoe. The machine then automatically comes to rest and the operator may make any adjustments of the shoe S on the last L as may be necessary, and he may straighten out any wrinkles which may be present in the upper at the heel end of the shoe to prepare this portion of the shoe for engagement with the horn H and its gripper member. He then initiates the second stage of the cycle by again depressing the treadle T, during which stage the bottom engageable member B is moved rearwardly of the shoe while pressing heavily against the shoe bottom. The instep pad I is moved rearwardly against the instep of the shoe at the same time, yielding upwardly as occasioned by the contour of the shoe but always exerting pressure against the shoe. Before the blanket B has completed its rearward movement, the horn H is rocked about the heel end of the last very much in the manner of a shoe horn which is manipulated by hand, thereby cooperating to draw the shoe rearwardly. This rocking movement of the horn H serves to clamp the rear end portion of the shoe upper against the gripper G, the horn and the gripper then being moved upwardly to draw the rear end of the shoe upwardly upon the last. The shoe is thus completely seated upon the last, and continued upward movement of the horn H withdraws it from between the shoe and the last. The instep wiper I is retracted to its initial position and the blanket B is withdrawn from engagement with the shoe bottom. The last pin P is then unlatched from its operating position and is enabled to swing to a position such that the operator can readily remove the last and shoe from it. The second stage of the cycle is now complete and the machine again automatically comes to rest. During this pause, which may be very brief, the operator removes the last with the shoe thereon from the last pin P, so that the last and the shoe will be out of the way of the horn H and the gripper G in the course of their return movement. The third stage is initiated by the operator once more depressing the treadle T and during this stage the horn H, the gripper G, and the pad or blanket B return to their initial position.

The supporting structure of the machine consists of a hollow frame 20 which houses the greater portion of the driving mechanism and which supports a head 22 having an upward goose-neck extension 24 which supports the last pin P. Rigidly mounted upon the head 22 is a bracket 26 which supports certain fulcrum pins for the operating mechanisms as will hereinafter be pointed out.

Journaled in bearings in the lower portion of the frame or housing 20 is a drive shaft 28 (Fig. 1) carrying at one end a sprocket 30 over which passes a chain 32. A motor 34 (Fig. 3) is supported upon one side of the housing 20 and carries upon its armature shaft a sprocket 36 which drives the chain 32 and thereby the shaft 28. The sprockets 30 and 36, together with the chain 32, are enclosed in a housing 37 supported by the frame 20. A worm gear 38, rotatably sleeved upon the shaft 28 and enclosed in a housing 39, is driven by a clutch mechanism which will presently be described. Meshing with the worm 38 is a worm wheel 40 which is secured to a cam shaft 42 journaled in a bearing in the housing 20 and also in a bearing formed in a supporting web 43 within the housing 20. The above-mentioned clutch mechanism comprises a driving clutch member 44 which is secured upon the shaft 28, and a driven clutch member 46 freely rotatable upon the shaft 28 and enclosed in a housing 47. The driven clutch member 46 is slidable along the shaft 28 into and out of driving engagement with the driving member 44 and it is provided with a hub 48 having a driving connection in the form of a tongue-and-slot coupling 50 with the worm 38, so that the clutch member 46 may slide along the shaft 28 without interrupting its driving engagement with the worm 38. A plurality of compression springs 51 interposed between the hub 48 and the worm 38 tend to urge the driven clutch member 46 into driving engagement with the driving clutch member 44. The ends of the springs 51 are housed in recesses formed in the hub 48 and in the worm 38 respectively. The hub 48 has formed in it a circumferential groove 52 into which extends a pair of pins 54 carried by a forked clutch-control lever 56 which has a bell crank extension 58. The lever 56 is fulcrumed upon a pin 60 carried by a bracket 68 which is supported by and depends from the frame 20. A dog 64 is pivotally mounted upon a pin 66 carried in the bell crank extension 58 of the clutch shifting lever 56. Extending upwardly from the dog 64 is an abutment plate 70 the upper edge of which is engageable with the under surface of a latch plate 72 carried upon a lever 74. The lever 74 is fulcrumed upon a pin 76 carried by the bracket 68, and the outer end of the lever 74, beyond the latch plate 72, is forked. The lever 74 has a bell crank extension 78 to which is pivotally connected one end of a link 80, the opposite end of the link 80 being pivotally connected to a bell crank extension 82 of a lever 84 which is pivotally mounted upon a fulcrum pin 86 carried by a bracket 88 depending from and supported by the frame 20. Mounted upon the lever 84 is a cam roll 90 which engages a cam 92 secured upon the shaft 42. A spring 94 which is anchored to the housing 20 urges the lever 74 in a clockwise direction as viewed in Fig. 1 and thereby tends to maintain the roll 90 against the cam 92. The treadle T, which is normally supported by a tension spring 95 anchored to the frame 20, is fulcrumed upon a pin 96 carried by the lower portion of the frame 20. Extending upwardly from the treadle T and pivotally connected thereto is a rod 98 carrying a block 100 which engages an abutment plate 102 mounted upon the dog 64 so that depression of treadle T will cause the lower edge of the block 100 to bear down upon the plate 102 and thereby to rotate the dog 64 in a counterclockwise direction as viewed in Fig. 1. The abutment plate 70 is thus removed from beneath the latch plate 72, permitting the clutch shifting lever 56 to rotate in a clockwise direction as viewed in Fig. 1 and thereby permitting the driven clutch member 46 to move into operative engagement with the driving clutch member 44 and thus causing rotation of the worm 38 and cam shaft 42. The block 100 is provided with a cam surface 104 which bears against a pin 106 on the lever 74 in such a manner that as the block 100 descends it is forced out of operative engagement with the abutment plate 102. The treadle T is thus automatically disconnected, once it has been depressed, from the instrumentalities which engage the clutch, so that even if the operator should inadvertently keep his foot upon the treadle it would have no further effect during the stage of the cycle which has been initiated. A tension spring 108 is interposed between the rod 98 and the dog 64 and tends not only to urge the dog 64 in a clockwise direction as viewed in Fig. 1 against a stop on the bell crank arm 58 but it also tends to urge the block 100 to the right, as viewed in Fig. 1. As the treadle rises, under the influence of the spring 95, to its normal position, the lower edge of the block 100 slips over the outer edge of the abutment plate 102 into operative position. The dog 64, under the influence of the spring 108, tends to return to its normal position relatively to the bell crank extension 58; but the abutment plate 70 will have been brought up between the forks of the lever 74 by the swinging of the clutch control lever 56 into driving position, so that now the right-hand face of the abutment plate 70 will bear against the left-hand edge of the latch plate 72. The cam 92 is so formed that as the cam shaft 42 rotates the lever 74, by reason of its connection with the cam roll 92 and under the influence of the spring 94, rises, thereby permitting the abutment plate 70 to swing into a position where it is once more beneath the latch plate 72. Continued rotation of the cam shaft 42 brings a raised portion of the cam 92 into engagement with the cam roll 90, causing the latch plate 72 to bear down upon the abutment plate 70 and thereby to depress the bell crank extension 58 of the clutch control lever 56, thus opening the clutch and bringing the cam shaft 42 to rest and completing one cycle of operation. In the illustrated machine the cam 92 has three such raised portions with three intervening depressions, so that the machine will operate in three cycles.

The last pin P projects from a carrier block 110 pivotally mounted upon a pin 112 secured in the lower free extremity of the goose-neck extension 24. The carrier block 110 is free to swing about the pivot 112 to move the last pin from a convenient position for receiving the last, as shown in Fig. 18, to the operating position, shown in Fig. 1. In order to maintain the last pin yieldingly in position to receive a last the block 110 is connected through a link 114 and rod 116 (Fig. 3) to an upwardly spring-pressed plunger 118 which is guided for vertical sliding movement within a bore 120 in the solid extremity of the goose-neck 24. To hold the last rigidly in operating position a spring-pressed latch bar 122 arranged to slide vertically within a guideway 124 is shaped at its lower end to enter a notch 126 in the last pin carrier block 110. The latch bar 122 is adapted to be tripped automatically to release the last pin carrier block 110 at the end of each lasting operation so that the last may be swung upwardly by the spring-pressed plunger 118 to facilitate the removal of the relasted shoe from the machine. For the purpose of enabling the latch bar thus to be tripped a pin 128 extends into the path of a member later to be described which carries the shoe-horn H. To enable the latch bar 122 to be tripped manually, if desired, to permit removal of the shoe before completion of the relasting operation another pin 130 (Fig. 1) extends through a slot 132 in the latch bar housing into a position to be conveniently manipulated by the operator. A face 134 on the block 110 serves as a cam surface for the lower end of the latch bar 122 when the last L is again swung downwardly to its latched position. To prevent accidental engagement between the horn H or any of its operating mechanism with the latching mechanism a guard 138 of spring metal is secured to the upper portion of the goose-neck 24 and extends downwardly having a curved extremity which is notched about the carrier block 10.

The shoe engaging instrumentalities B, I, and H above referred to all derive their respective movements from the cam shaft 42. They will now be described in detail together with their operating mechanisms.

Figure 2:
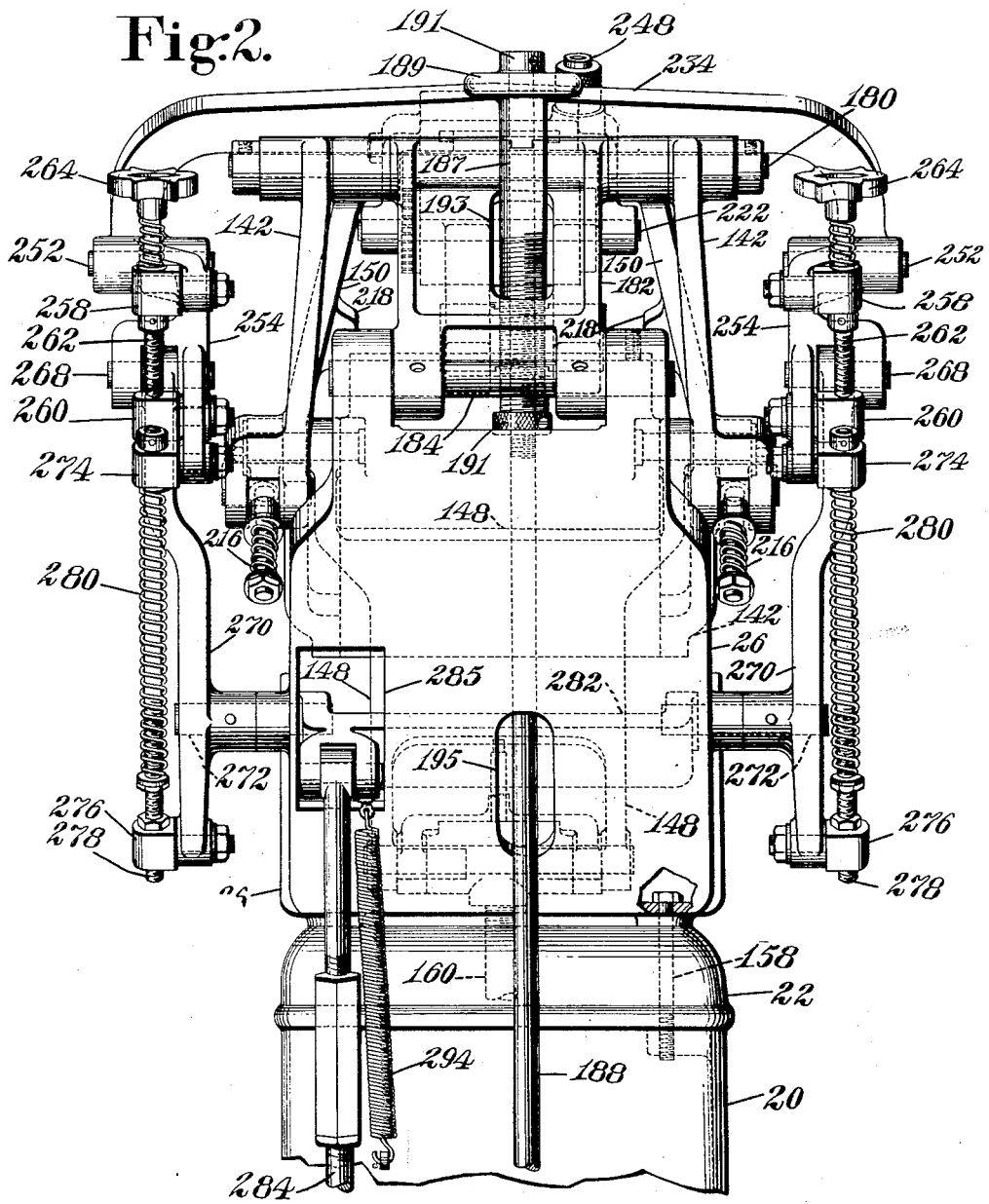
Fig. 2 is a view in end elevation of the upper portion of the machine shown in Fig. 1.
Figure 4:
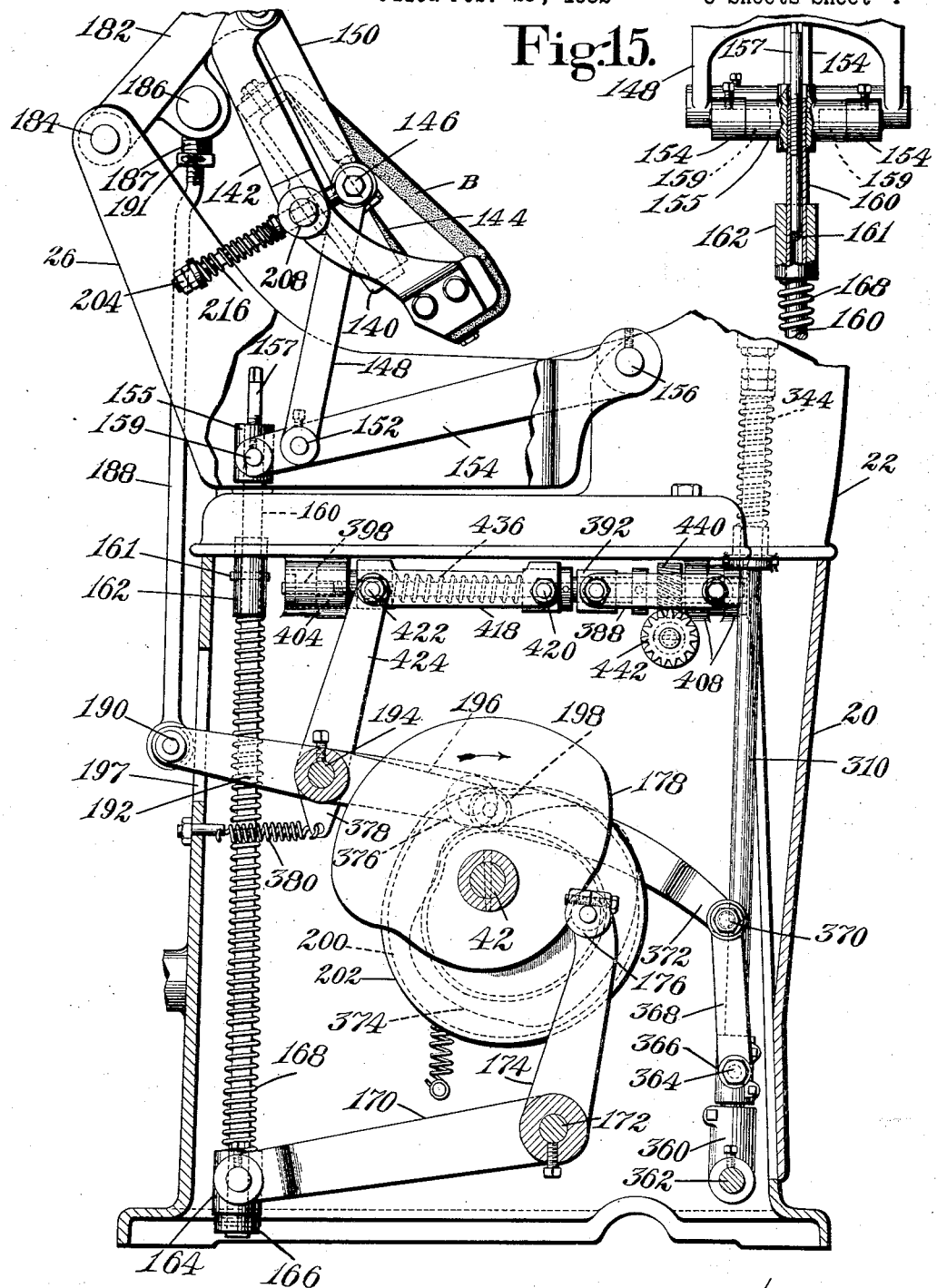
Fig. 4 is an elevational view similar to Fig. 3 but showing the base of the machine in section and omitting certain portions shown in Fig. 7.
Figure 5:
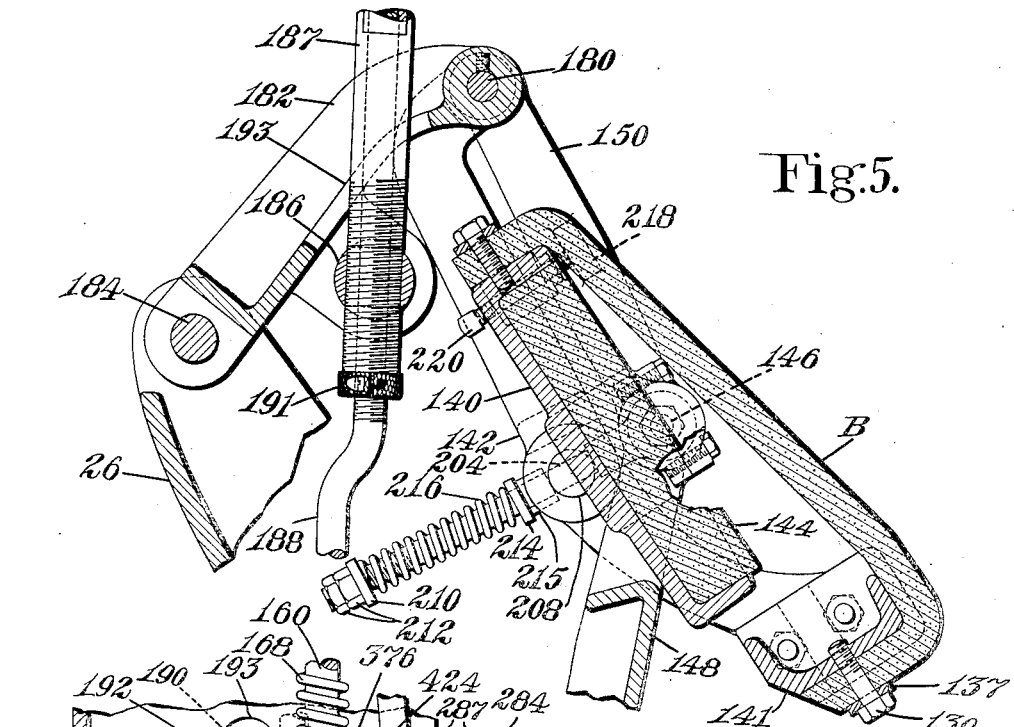
Fig. 5 is a sectional view of the shoe bottom engaging member.
Figure 6:
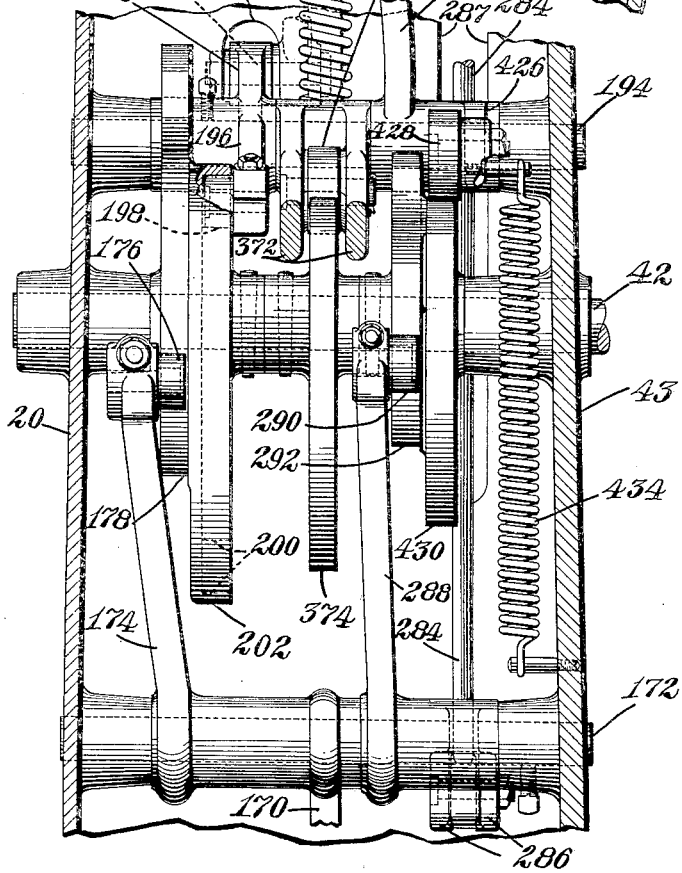
Fig. 6 is a view in end elevation of certain cam mechanism within the frame of the machine.

The pad or blanket B in the illustrated machine consists of a strip of rubber partially overlying and having one end carried by a box 140 (Fig. 5). The opposite end of the blanket B is carried by a yoke bar 141 of a yoke-shaped lever having a pair of arms 142. The yoke bar 141, as a matter of convenience in assembling, may be separate from the arms 142 and may be secured thereto by bolts. The blanket ends are secured to their respective carrying members by clamping bars 137 held by bolts 139 passing through the blanket and threaded into the respective carrying members. The arms 142 straddle the box 140. The box 140 is open at the top and carries a thick pad 144 in the form of a block of rubber which extends through the open top of the box and which affords a flat resilient support for the under surface of the blanket B. The blanket B is normally flat and of uniform thickness, and the portion of the blanket B which is directly supported by the rubber block 144 will, together with the block 144, constitute a flat resilient friction pad. The box 140 is trunnioned upon a pair of pins 146 which constitute a common pivotal connection between the end of a link 148 and the ends of a pair of links 150 respectively. The links 150 move in unison and they will later be referred to as a single member. The opposite end of the link 148 is pivotally mounted upon a pin 152 (Fig. 4), and the pin 152 is carried in a forked lever 154 fulcrumed upon a pin 156 secured in the head 22 of the machine. As shown in Fig. 5, the link 148 consists of a central web having a pair of stiffening flanges on each side which extend upwardly beyond the web and which straddle the box 140 but are between the arms 142, being pivotally connected at their extremities to the trunnion pins 146 respectively. The flanges extend likewise below the central web and straddle the fork of the lever 154, being pivotally connected at their lower extremities to the pin 152. As a matter of convenience in the illustrated machine the bracket 26 also is secured to the pin 156 but the bracket 26 is also secured by bolts 158 (one of which is shown in Fig. 2) to the head 22 so that, as previously stated, the bracket 26 is rigid in relation to the head 22. Pivotally connected to the lever 154, by means of a trunnion block 155 (Fig. 15) having a pair of trunnion pins 159, is a rod 160. The upper end portion of the rod 160 is threaded into the trunnion block 155 and has a threaded longitudinal bore which engages a threaded pin 157. The lower end of the pin 157 abuts a cross pin 161 which is securely fixed in a collar 162 on the rod 160. Slots for the cross pin 161 are provided in the rod 160 to enable the collar 162 to slide freely upon the rod 160. Another collar 164 (Fig. 4) is carried upon the lower portion of the rod 160 but with provision for lengthwise sliding movement with respect to the rod. A retaining collar 166 upon the lower extremity of the rod 160 holds the collar 164 from slipping off the rod. Surrounding the rod 160 and interposed between the collars 162 and 164 is a compression spring 168. The pin 157 has a squared head which enables it to be turned to adjust the pressure of the spring 168. The collar 164 has a trunnion connection with the forked end of a lever 170 which is pivotally mounted upon a pin 172 secured within the frame 20. The lever 170 has a bell crank extension 174 which carries a cam roll 176. This cam roll rides upon the periphery of a cam 178 secured upon the cam shaft 42. It is evident that the cam 178 in its rotation will swing the bell crank extension 174 and therefore the lever 170 in a clockwise direction, as viewed in Fig. 4, thereby transmitting pressure through the compression spring 168 into the rod 160 and raising the lever 154 and the link 148. In the illustrated machine the weight of the rod 160 and the members operated thereby is sufficient to maintain the cam roll 176 in engagement with the cam 178.

The links 150 are pivotally mounted upon a pin 180 (Fig. 5) which is carried at one end of a lever 182. The opposite end of the lever 182 is fulcrumed upon a pin 184 secured in an upward extension of the bracket 26. The lever 182 has a pair of depending ears which carry a trunnion pin 186 into which is threaded a sleeve 187 which is freely rotatable on a rod 188. A hand wheel 189 (Fig. 1) interlockingly engages the sleeve 187 for turning the latter to adjust the lever 182 upwardly and downwardly relatively to the rod 188. The sleeve 187 and the hand wheel 189 are held against longitudinal movement relatively to the rod 188 by means of a pair of thrust collars 191 securely fixed to the rod 188. The lever 182 is provided with a central web having an opening 193 through which the rod and the sleeve extend to render the hand wheel accessible. The rod 188 extends downwardly through an opening 195 (Fig. 2) in a rear wall or web of the bracket 26. The lower end of the rod 188 (Fig. 4) is outside of the frame 20 and is pivotally connected by means of a pin 190 to a lever 192 which is fulcrumed upon a pin 194 secured within the frame 20. The lever 192 enters the frame 20 through an opening 197. An extension 196 of the lever 192 carries a roll 198 which engages a slot 200 formed in the side face of a cam 202 which is fixed upon the cam shaft 42. It will be noted that the cam 202 positively controls the movement in either direction of the lever 192 and thereby serves positively to raise and lower the lever 182 to impart movement to the links 150.

The lever arms 142 are pivotally mounted upon the pin 180 and are yieldably connected to the trunnion pins 146 respectively of the box 140. This yielding connection comprises a pair of rods 204 which are pivotally mounted respectively upon the trunnion pins 146. Each of the rods 204 is slidable in a transverse bore in one of a pair of swivel or trunnion pins 208, each of the pins 208 being rotatably mounted in one of the lever arms 142. A retaining washer 210 is secured by nuts 212 upon the free extremity of each of the rods 204. A loose washer 114 on each of the rods 204 bears a spacing sleeve 215 which in turn bears against the respective pin 208. Interposed between the washer 210 and the washer 214, is a compression spring 216 surrounding each of the rods 204 and tending to urge the yoke bar 141, to which is secured an end of the blanket B, upwardly to carry the blanket away from the upper surface of the rubber pad 144. It is evident that in the construction above described either the link 148 or the pair of links 150 may be regarded as a carrier for the box 140, since the box is mounted upon the pivotal connection between the link 148 and the links 150. It is also evident that the link 150 may be regarded, not only as a carrier of the box 140, but also of the yoke-shaped lever comprising the yoke bar 141 and the arms 142, since this lever is pivotally connected to the pivot pin 180 of the links 150. The links 150 thus constitute a carrier for the instrumentalities which support the blanket B, and the movements of the blanket B will correspond to the movements of the links 150 except in so far as the blanket B and its supporting structure yield under the pressure of the shoe. The tension in the blanket B resulting from the spring pressure upon the lever 142 tends to rotate the box 140 in a clockwise direction as viewed in Fig. 5. The tilting movement of the box 140 under the influence of the blanket B is limited by a pair of lugs 218 on the links 150 respectively which engage a pair of stop screws 220 on the plate 140, so that the upper surface of the pad 144, as it is raised to press the blanket B against the shoe bottom, will not be inclined at an excessively steep angle with respect to the shoe bottom. The blanket B is of sufficient length to engage a shoe bottom from the front end of a shoe well into the shank of the shoe. The trunnion mounting of the box 140 enables the pad 144, as it is raised, to assume the inclination of the forepart of the shoe bottom. The pad 144 affords direct support to the blanket B from beyond the toe end of the shoe up to about the ball line. The end of the blanket B which is supported by the yoke bar 141 is urged by the pressure of the springs 216 up into the shank of the shoe so that a portion of the blanket B not directly supported by the rubber block 144 may develop frictional contact with the surface of the shoe bottom.

The instep pad I (Figs. 7 and 8) consists of a rubber roll having a rigid core rotatably mounted upon a pin 222 secured in a carrier 224. Fixed upon the roll I is a ratchet 226. A pawl 228 pivotally mounted upon the carrier 224 is urged into engagement of the teeth of the ratchet 226 by means of a spring 230. The ratchet is formed to hold the instep-engageable member I against clockwise rotation as viewed in Figs. 7 and 8 but to permit counter-clockwise rotation. It is evident, therefore, that as the pad I advances in its operative movement it is held against rotation, but it may rotate freely during its retraction thereby avoiding any danger of withdrawing the shoe with it. The carrier 224 is slidably mounted in a slideway 232 formed in a yoke 234. A rack 236 formed upon the carrier 224 is engaged by a pinion 238 having a shaft 240 which is journaled in the yoke 234. A knurled sleeve 242 keyed upon the shaft 240 enables the operator to rotate the pinion 238 and thereby to adjust the position of the pad I along the guideway 232. A dowel pin 244 extending from the yoke 234 engages one of a series of holes 246 formed in the end face of the knurled sleeve 242 and thus serves to hold the pad I in any desired position of adjustment. Upon the outer portion of the shaft 240 is fixed a plunger 248 and interposed between the plunger 248 and the base of the sleeve 242 is a compression spring 250 which serves to hold the sleeve in engagement with the dowel pin 244 but which may yield to permit the operator to withdraw the sleeve 240 when he desires to change the adjustment of the pad I.

The yoke 234 is pivotally mounted upon a pair of pins 252 which are carried in a pair of levers 254 respectively. Each of the levers 254 has a bell crank extension 256. A swivel block 258 is carried upon an extension of each of the arms of the yoke 234, and a swivel block 260 is pivoted upon each of the bell crank extensions 256. An adjusting screw 262 is threaded through each of the swivel blocks 260 respectively and passes through each of the swivel blocks 258 respectively, being held, however, against longitudinal movement with respect to the swivel blocks 258. A hand wheel 264 is provided for turning each of the adjusting screws 262 respectively and thereby varying the angular position of the yoke 234 about the pins 252 relatively to the angular position of the levers 254. To avoid any need for having to turn both of the hand wheels 264 simultaneously, each of the screws 262 has an unthreaded portion of its shank which is relatively slidable through its swivel block 258. A thrust collar 263 secured to each screw 262 abuts the lower surface of the corresponding swivel block 258, and a compression spring 265 surrounding the upper shank portion of each screw 262 is interposed between the upper surface of its corresponding swivel block 258 and the hand wheel 264. Each hand wheel 264 may thus be turned independently of the other, notwithstanding the unitary construction of the yoke 234; and after one side has been adjusted the other side may be adjusted to correspond. It will be evident that the yoke 234 constitutes in effect an extension of the levers 254 with provision for adjusting it relatively to these levers. Each of the levers 254 is mounted upon one of a pair of pins 268; and each of the pins 268 is carried in one of a pair of levers 270 which is mounted upon pins 272 respectively. The pins 272 are secured in the bracket 26. Pivoted upon the extremity of each of the bell crank extensions 256 is a swivel block 274. A similar pair of swivel blocks 276 are pivotally mounted upon lower extensions of the levers 270. A rod 278 passes through each of the swivel blocks 274 and 276 on each side of the bracket 26. Each rod 278 is threaded into its swivel block 276 but is freely slidable in its swivel block 274. A compression spring 280 on each of the rods 278 tends to urge the bell crank extensions 256 in a clockwise direction as viewed in Fig. 7 as far as permitted by retaining collars 279 on the rods 278 respectively. The threaded engagement of the lower ends of the rods 278 with the swivel blocks 276 respectively enables the pressures of each of the springs 280 to be adjusted. It is, therefore, apparent that the springs 280 may be adjusted to provide any desired degree of pressure of the instep pad I against the shoe S; and the yoke 234 (and with it the pad I) may be adjusted for position, by means of the hand wheels 264, independently of the adjustment of the spring pressures. The yoke 234 may thus be regarded as an extension of the levers 270 with provision for angular adjustment with respect thereto and also with provision for yielding with respect thereto to enable the pad I to yield upwardly as occasioned by the contour of the instep of the shoe S. The lower ends of the levers 270 are connected by a crank 282 having an arm 283 which extends out through an opening 285 (Fig. 2) in the rear wall of the bracket 26. The upper end of a rod 284 is pivotally connected to the crank arm 283. The lower end portion of the rod 284 enters the frame 20 through an opening 287, and the lower end of the rod 284 is pivotally connected to a forked end of a lever 286 which is fulcrumed on the pin 172. A bell crank extension 288 of the lever 286 carries a cam roll 290 which engages the periphery of a cam 292 mounted upon the shaft 42. A tension spring 294 anchored to the frame 20 and secured to the crank arm 283 serves to rotate the lever 270 in a counter-clockwise direction as viewed in Fig. 7, thereby tending to maintain the instep pad I in retracted position and to cause the cam roll 290 to bear upon the periphery of the cam 292. It is evident that rotation of the cam 292 will serve to advance the instep pad I against the upper of the shoe S; and the roll I, being prevented from rotating during this advancing movement, will exert a frictional grip upon the shoe tending to seat the shoe upon the last.

The horn H (Figs. 9 and 12) for mounting the counter portion of the shoe on the last is, in the illustrated machine, formed in two parts 296 which are hinged relatively to each other about a pintle 298 the axis of which coincides with the longitudinal center line of the horn. The two members 296 are urged outwardly with respect to each other by a spring 300 surrounding the pintle 298, and their outward movement is limited by a stop 302 on the pintle 298. A carrier block 304 upon which the pintle 298 is secured is pivotally mounted upon a pin 306 which is carried in the upper end of a block 308 threaded upon the upper end of a tube 310. A lock nut 311 holds the block 308 securely upon the tube 310. An extension 312 of the carrier block 304 is connected to a tension spring 314 extending down within the tube 310 and anchored to a cross piece 316 secured to and within the tube 310. The spring 314 tends to rotate the horn H in a counter-clockwise direction as viewed in Fig. 9, thereby urging it upwardly toward the heel end of the last L to a stop position determined by the engagement of the rear end of the extension 312 with a surface 318 formed on the block 308. The horn H is thus yieldingly maintained in the position shown in Fig. 9. Cooperating with the horn H is the outside gripper member G (Figs. 9 and 13) comprising a pair of horn shaped elements 320 which are pivotally mounted upon a pintle 322, the axis of which pintle coincides with the longitudinal center line of the gripper member. The horn shaped elements 320 are urged inwardly or toward each other by a spring 324 surrounding the pintle 322, their relative inward movement being limited by a stop 326 carried by the pintle 322. A block 328, which carries the pintle 322, is pivotally mounted upon the pin 306. A pair of links 330 are pivotally connected at their upper ends to a forked rearward extension 332 of the block 328. The lower ends of the links 330 are pivotally connected to the upper end of a tube 334 which is telescopically slidable within the tube 310. A pair of slots 336 are formed in the tube 334 to enable the cross piece 316 to extend through the tube 334 without interfering therewith. The lower end of the tube 334 carries a cross pin 338 to which is secured a collar 340 slidably mounted upon the tube 310. A pair of slots 342 formed in the wall of the tube 310 enable the pin 338 to pass therethrough without interference. The lower end of a compression spring 344 surrounding the tube 310 bears against the upper edge of the collar 340, and the upper end of the spring 344 bears against the under surface of a washer 346 carried on the tube 310. The washer 346 is held against upward movement by a nut 348 threaded on the tube 310 and which in turn is secured by a lock nut 350. A thrust collar 352, which is adjustably secured upon the tube 310 by a set screw 354, limits the downward movement of the collar 340 and therefore the upward movement of the gripper G under the influence of the spring 344 and thereby determines the normal angular position in which the gripper member is yieldingly held relatively to the block 308. As shown in Fig. 9, this position is such as to insure the gripper member being spaced considerably below the horn H. The stress of the spring 344 may be adjusted as desired by manipulation of the nuts 348 and 350.

The members 296 of the horn H are curved so that in cross section the horn assumes the form of a shallow U-shaped channel. The members 320 of the gripper G are also curved, and together they also form a U-shaped channel; but the channel of the gripper is deeper than that of the horn and its sides curve more nearly into parallel relation with each other. When the horn H and the gripper G cooperate to grip the heel end of the upper of a shoe between them, the horn members 296 yield toward each other to accommodate themselves to the form of the shoe; but under the influence of the spring 300 they tend to separate, thus exerting outward pressure against the interior of the shoe. The gripper members 320, on the other hand, yield outwardly to conform to the exterior of the heel end of the shoe; but under the influence of the spring 324 they tend to close, thus pressing inwardly against the shoe. The gripping pressure of the horn H and the gripper G is distributed over areas which are distributed on the two sides of the seam line, respectively, of the shoe, and which are adjacent to the tip ends of the respective horn and gripper members.

In addition to the tilting or rocking movements of the horn H and its cooperating gripper member about the pin 306, the horn and gripper member are moved together bodily in a curved path which is the resultant of a heightwise component of movement and of a component which is more or less lengthwise relatively to the shoe S. The path followed by the axis of the pin 306, as determined by these two components, is shown in a broken line 356 in Fig. 3. The heightwise component is rendered possible by mounting the tube 310 telescopically upon a rod 358 so that the tube 310 may slide freely up and down upon the rod. The lengthwise component is rendered possible by providing a pivotal support for the lower end of the rod 358. This support comprises a socket 360 (Fig. 4) into which the lower end of the rod 358 is securely clamped, and a fulcrum pin 362 upon which the socket 360 is pivotally mounted. The fulcrum pin 362 is supported by the frame 20 within the lower portion thereof. It is evident that by reason of this arrangement the rod 358, and with it the tube 310, may be rocked back and forth about the pin 362, while at the same time the tube 310 may be slid up and down upon the rod 358.

Up-and-down movement is imparted to the tube 310 through a pair of trunnion pins 364 carried by a sleeve 366 which is securely clamped in any desired position of up or down adjustment upon the lower end portion of the tube 310. Pivotally connected to the trunnion pins 364 are the lower ends of a pair of links 368 respectively. The upper ends of the links 368 are pivoted upon a pin 370 carried in the end of a lever 372 which is fulcrumed upon the pin 194. The lever 372 comprises a pair of arms which straddle a cam 374 fixed upon the cam shaft 42. Journaled in between the arms of the lever 372 is a cam roll 376 which rides upon the periphery of the cam 374. The fulcrum end of the lever 372 has a hub from which extends a crank arm 378; and a tension spring 380 anchored at one end to the frame 20 and connected at its other end to the crank arm 378 urges the lever 372 downwardly to maintain the roll 376 upon the cam 374. Rotation of the cam 374 will serve to raise the cam roll 376 and with it the horn and gripper member, and continued rotation of the cam 374 will enable these members to be lowered by the springs 380.

Lengthwise movement relatively to the shoe S is imparted to the horn H and its gripper member by mechanism connected, through a bearing member 382, secured to the rod 358. In the illustrated machine the member 382 is received within and pinned to the rod 358 as shown in Figs. 9, 11 and 14. The member 358 passes through a longitudinal slot 384 formed in the tube 310, thereby avoiding interference with the up-and-down movement of the tube. The member 382 carries a pin 386 upon which is pivoted one end of a link 388. The other end of the link 388 (Fig. 14) is pivoted upon a pin 390 extending laterally from a collar 392 which is securely held in any desired position of longitudinal adjustment upon a sleeve 394 by a set screw 396. The sleeve 394 is carried by a rod 398 which is freely rotatable relatively to the sleeve 394. Relative longitudinal movement between the sleeve 394 and the rod 398 is prevented, however, by a pair of collars 400 which abut respectively the ends of the sleeve 394 and which are pinned upon the rod 398. One end of the rod 398 is supported by a nut 402 (Fig. 7) threaded upon the rod 398 and freely slidable within a bearing 404 carried by the frame 20. The nut 402 is held against rotation by a key-and-slot connection with the bearing 404. The other end of the rod 398 is supported by a sleeve 406 which is freely rotatable within a bearing 408 carried by the frame 20. Longitudinal movement of the sleeve 406, however, is prevented by a thrust collar 410 which is secured by a set screw 412 to the sleeve 406 and which engages an annular recess 414 formed in the bearing 408. The rod 398 is freely slidable within the sleeve 406, but is held from relative rotation with respect thereto by a key 415. Carried upon the rod 398 with provision for free relative longitudinal movement with respect thereto is a sleeve 416. The rod 398 is freely rotatable with respect to the sleeve 416. One end of a link 418 is pivotally connected, by a pin 420, to the sleeve 416; the other end of the link 418 being connected, by a pin 422, to a lever 424, which is fulcrumed upon the pin 194. The lever 424 has a bell crank extension 426 which carries a cam roll 428. A cam 430 mounted upon the cam shaft 42 has its periphery engaged by the cam roll 428 and thereby rocks the lever 424 in one direction. A tension spring 434 anchored at its lower end to the frame 20 and connected at its upper end to the bell crank extension 426 maintains the roll 428 in engagement with the cam 430. As shown in Fig. 7, the effect of the cam 430 is to rock the lever 424 to the left and, upon continued rotation, to permit the spring 434 to rock the lever 424 to the right. A compression spring 436 surrounding the rod 398 is interposed between the nut 402 and the sleeve 416, thereby abutting one end of the sleeve 416, and also, through the rod 398, causing the left-hand thrust collar 400, as shown in Fig. 14, to bear against the opposite end of the sleeve 416.

It will be evident from the foregoing description that the cam 430, in rocking the lever 424, will cause a component of movement to be imparted, yieldingly through the spring 436, to the horn H and its cooperating gripper member G in a direction toward the heel end of the shoe S, the return movement along the same component being effected by the spring 434 and through the engagement of the sleeve 416 with the left-hand thrust collar 400. The nut 402, by reason of its key connection, as above described, to the bearing 404, enables the compression of the compression spring 436 to be adjusted conveniently by turning the rod 398. Such turning of the rod 398 is effected by a helical gear 440 carried by the sleeve 406. In the illustrated machine the sleeve 406 constitutes an extension of the hub of the gear 440. The gear 440 meshes with a helical gear 442 carried upon a shaft 444 which is journaled in and which passes through a wall of the frame 20. A hand wheel 446, mounted upon the shaft 444 outside of the frame 20, enables the operator to effect the adjustment under consideration. A retaining collar 448 (Fig. 7) secured upon the far end of the rod 398 for engagement with the nut 402 serves to prevent the rod 398 from being screwed out of the nut 402.

Figure 1:
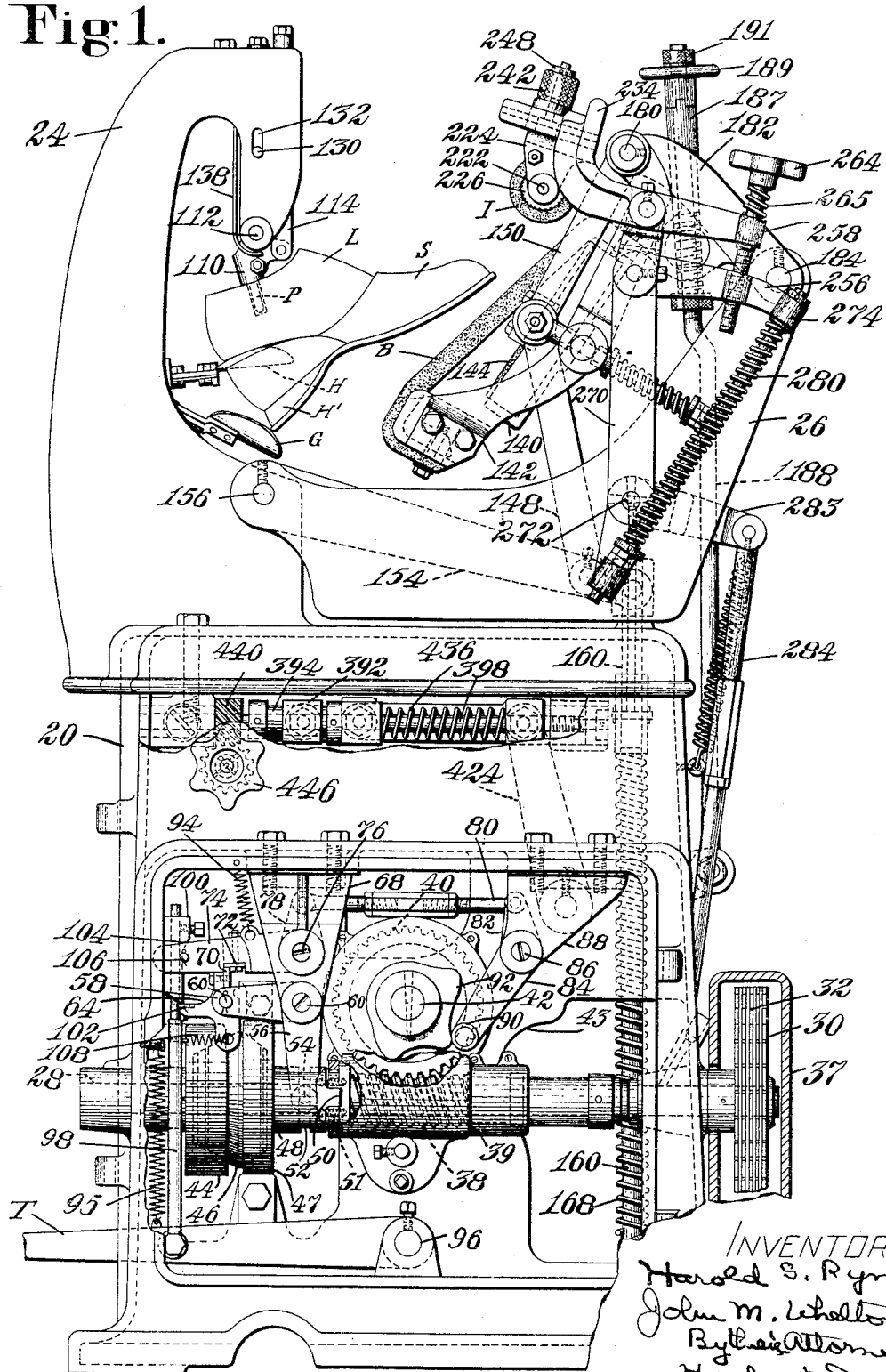
Figure 3:
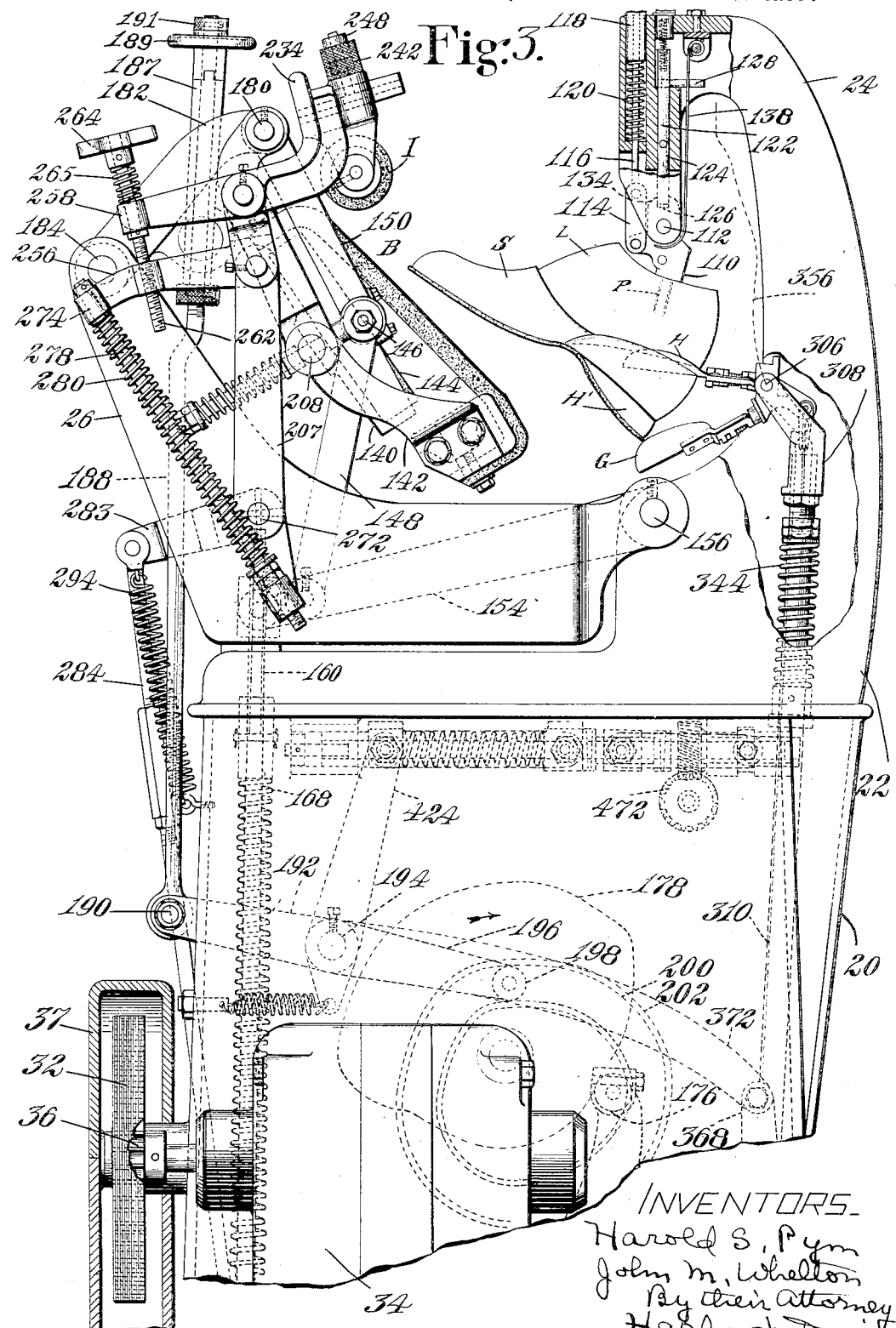
Fig. 3 is an elevational view of the side of the machine opposite to that shown in Fig. 1.

The operation of the illustrated machine, as has already been pointed out, is in three cycles. The last L, usually having the shoe S partially mounted by hand thereon, is placed upon the last pin P while the latter occupies the upwardly tilted position shown in Fig. 18 and the last is then swung downwardly to operative position, as shown in Figs. 1 and 3, the last pin carrier being locked to hold the last in this position. As the last is being swung downwardly, the horn H will yield to accommodate the heel end of the last, and when the last pin is latched in its operative position the horn H will extend within the heel end of the shoe and will bear upwardly against the last, holding the last upon the last pin. All of the parts of the machine will now be in their initial positions as shown in Figs. 1 and 3. The operator then depresses the treadle T, thus effecting engagement of the clutch and starting the first stage in the cycle of operation.

As the cam shaft 42 rotates, the cam 178 will rock the lever 170 and will thus cause an upward thrust to be imparted to the link 148, raising the box 140 as far as permitted by the engagement of the blanket B with the forepart of the shoe bottom. Further rocking movement of the lever 170 caused by the cam 178 will be taken up by the yielding of the spring 168, causing the spring 168 to exert a yielding upward thrust upon the supporting structure of the blanket B. The stop screws 220 will prevent the box 140 from rotating about its trunnion pins, enabling the portion of the rubber block 144 which is beneath the shoe to press against the under surface of the blanket B. A portion of the blanket B which is not supported by the rubber block 144 will be maintained in engagement with the shoe bottom by the pressure of the springs 216. While the blanket B is being moved upwardly, as above described, the cam 292 will cause the rod 284 to be pushed upwardly, bringing the instep pad I almost into engagement with the forepart of the shoe upper. The first stage of the cycle is now complete and the machine automatically comes to rest, affording the operator an opportunity to straighten out the upper at the heel end of the shoe or to perform any other manipulations upon the shoe which may be called for. The second stage of the cycle is then initiated by again depressing the treadle T. During this stage the rotation of the cam 202 causes the rod 188 to be pulled downwardly, rocking the lever 183 about its fulcrum 184 and thereby causing the blanket B to be advanced toward the heel end of the last. The springs 216 will cause the end portion of the blanket B supported by the yoke bar 141 to follow the curvature of the last bottom up into the concavity of the shank as the blanket advances. The box 140 may rock about its trunnion pins in a counter-clockwise direction, as viewed in Fig. 16, to enable the rubber block 144 to assume the inclination imposed upon it by the shoe bottom; and the heavy pressure of the spring 168 will cause the shoe bottom to be somewhat embedded in the blanket B, thereby distributing the pressure of the blanket B over a relatively large area. Rotation of the cam 292 will bring the instep pad I into engagement with the forepart of the shoe upper, the springs 280 causing the instep pad to bear downwardly upon the shoe with yielding pressure. It will be noted that the bottom-engaging and the instep-engaging members, as they approach the shoe, do not necessarily move in unison, and also that they move along differently directed paths, the bottom-engaging member moving toward the instep-engaging member as well as toward the shoe. They are, however, moved in timed relation to each other, and along paths so chosen that each member will be given its own most suitable angle of approach, with a view to obtaining a maximum of cooperation between them. Fig. 16 shows the positions of the operating instrumentalities at an early stage of the second cycle. The rearward movements of the instep pad I and of the blanket B urge the forepart of the shoe completely upon the last. Before such movements have been completed, however, the rotation of the cams 374 and 430 will cause the horn H to rock yieldingly about the heel end of the last until the heel end of the shoe upper is gripped between the horn H and the gripper I. The resultant operative movement of the horn H will resemble that of the ordinary hand-manipulated shoe-horn, rocking about the heel end of the last as a fulcrum. It will be noted that the forward component of pressure against the heel end of the last will be yielding by reason of the spring 436, so that there can be no danger of breakage. The pressure of the gripper G against the rear end of the shoe upper will be yielding, by reason of the spring 344. It will be noted that the blanket B and the instep pad I, in completely seating the forepart of the shoe upon the last, will have already moved the shoe rearwardly as far as necessary. Consequently the horn H is not called upon, in the course of its rocking movement, to exert any substantial rearward pull upon the shoe. Its function is rather to guide the shoe upon the last and, in conjunction with the gripper G, to draw the rear end of the shoe upwardly. Continued rotation of the cams 374 and 430 will cause now the horn H and the gripper I to draw the heel portion of the shoe upwardly over the heel end of the last; and the pressure of the springs 216 will cause the end portion of the blanket B to press upwardly against the heel portion of the shoe and thus to assist the horn H and the gripper I. The operating instrumentalities will now occupy the positions shown in Fig. 17. The horn H and the gripper G will continue to move upwardly and out of engagement with the now lasted shoe; and they are given an excess movement such that the block 304 will trip the latch 128, as shown in Fig. 18. However, before such tripping is effected, the instep pad I is retracted to its initial position, and the blanket B is lowered out of contact with the shoe bottom, so that the last may swing up into the position shown in Fig. 18. The second stage of the cycle is completed by the above described tripping of the latch 128, and the machine again automatically comes to rest. The operator removes the last from the last pin and at once initiates the third stage of the cycle by once more depressing the treadle T. During this stage the blanket B and the horn H together with its gripper member I, return to their initial positions completing the entire cycle. The machine then automatically comes to rest.

A modification of the above-described machine is shown in Fig. 19. In this modification the blanket B and the yoke members 141 and 142, together with the rods 204 and their springs, nuts and washers, are omitted, and the rubber pad 144 presses directly against the shoe bottom. The leading edge of the box 140 is cut away, as shown at 452, to avoid any danger of this edge engaging the shoe bottom. Attached to each of the links 150 is one end of a tension spring 450, the other ends of the springs 450 being secured to the box 140. The springs 450 hold the box 140 yieldingly in the position determined by the screws 220 and the lugs 218, and thus perform one of the functions of the blanket B and the springs 216. The modified machine is otherwise similar in construction and mode of operation to the machine first described. In relasting certain types of shoes, it is necessary for the operator to straighten out a lining within the shoe during the pause between the first and second cycles. The insertion of the operator's fingers between the shoe and the last bends the shoe bottom, and in the case of shoes having relatively rigid shank stiffeners the shoe bottom cannot bend sharply enough around the end of the blanket B, which is supported by the yoke bar 141. In the modified form of the machine, however, the shoe bottom may begin to bend at the edge of the pad 144 so that, without any abrupt or excessive bending, there will be ample room at the heel end of the shoe for the operator's fingers to be inserted between the shoe and the last. Shoes provided with shank stiffeners usually have soles stiff enough to transmit a considerable rearward thrust from that portion of the sole which is engaged by the pad 144 to the rearward portion of the sole, so that the additional rearwardly directed shoe seating force obtained by the use of the yoke shaped lever having the arms 142 is not necessary.

Having thus described our invention, what we claim as new and desire to secure by Letters Patent of the United States is:

1. In a machine for effecting relative movement of lasts and shoes, a support for a last, a member frictionally engageable with the bottom of a shoe on a last on said last support, and operating means constructed and arranged yieldingly to press said frictionally engageable member against the shoe bottom and to effect bodily movement of said member lengthwise of the last and in frictional engagement with the shoe bottom thereby to move the shoe lengthwise relatively to the last.

2. In a machine for effecting relative movement of lasts and shoes, a support for a last, a friction pad of deformable material, and operating means constructed and arranged to press said pad against the bottom of a shoe on a last on said support and to move said pad lengthwise of the last in frictional engagement with the shoe bottom thereby to move the shoe lengthwise relatively to the last.

3. In a relasting machine, a support for a last partially inserted in a shoe, a friction pad of deformable material, operating means constructed and arranged to press said pad against the bottom of a shoe on a last on said support and to move said pad rearwardly of the last in frictional engagement with the shoe bottom to seat the forepart of the shoe upon the last, and a rigid backing for said pad pivotally connected to said operating means to enable said pad to tilt to accommodate the inclination of the shoe bottom.

4. In a relasting machine, a support for a last partially inserted in a shoe, a friction pad of deformable material, operating means constructed and arranged to press said pad against the bottom of a shoe on a last on said support and to move said pad rearwardly of the last and in frictional engagement with the shoe bottom to seat the forepart of the shoe upon the last, a rigid backing for said pad pivotally connected to said operating means to enable said pad to tilt to accommodate the inclination of the shoe bottom, and means for limiting the range of tilting movement of said rigid backing.

5. In a relasting machine, a support for a last partially inserted in a shoe, a friction pad of deformable material, operating means constructed and arranged to press said pad against the bottom of a shoe on a last on said support and to move said pad rearwardly of the last and in frictional engagement with the shoe bottom to seat the forepart of the shoe upon the last, a rigid backing for said pad pivotally connected to said operating means to enable said pad to tilt to accommodate the inclination of the shoe bottom, means for limiting the range of tilting movement of said rigid backing, and means for yieldably holding said rigid backing in a stop position determined by said limiting means.

6. In a machine for effecting relative movement of lasts and shoes, a support for a last, a substantially flat friction pad of resilient material, and operating means constructed and arranged to press said pad against the bottom of a shoe on a last on said support and to move said pad lengthwise of the last in frictional engagement with the shoe bottom thereby to move the shoe relatively to the last.

7. In a relasting machine, a last pin for supporting a last partially inserted in a shoe, a friction pad of deformable material, and operating means constructed and arranged to press said pad against the bottom of a shoe on a last on said support and to move said pad rearwardly of the last in frictional engagement with the shoe bottom to seat the forepart of the shoe upon the last.

8. In a relasting machine, a support for a last partially inserted in a shoe, a friction pad having an operating surface of sufficient extent to engage the forepart of a shoe bottom substantially from the toe end of the shoe to the ball line, and operating means constructed and arranged to press said pad against the bottom of the forepart of the shoe on the last and to move said pad rearwardly of the last in frictional engagement with the shoe bottom to seat the forepart of the shoe upon the last.

9. In a relasting machine, a support for a last partially inserted in a shoe, a substantially flat friction pad, means for bringing said pad into yielding engagement with the bottom of a shoe on a last on said last support and for maintaining the pad in such engagement, means for moving the pad rearwardly of the last while the pad is in yielding frictional engagement with the shoe bottom to seat the forepart of the shoe upon the last, and means constructed and arranged to operate the two pad-moving means in timed relation to each other.

10. In a relasting machine, a support for a last partially inserted in a shoe, a substantially flat friction pad, means for pressing said pad against the bottom of a shoe on a last on said last support and for moving the pad rearwardly of the last in frictional engagement with the shoe bottom to seat the forepart of the shoe upon the last, means for seating the counter portion of the shoe upon the last, and means constructed and arranged to operate said forepart and said counter seating means in timed relation to each other.

11. In a machine for effecting relative movement of lasts and shoes, a support for a last, a flexible friction member, means for pressing a portion of said friction member against the bottom of the forepart of a shoe on a last on said last support, means for pressing another portion of said friction member against the shank of the shoe, and means for urging lengthwise with respect to the last the friction member thus pressed against the shoe to move the shoe lengthwise relatively to the last.

12. In a relasting machine, a support for a last partially inserted in a shoe, a flexible friction member, means for pressing a portion of said friction member against the bottom of the forepart of a shoe on a last on said last support, resilient means carried by said pressing member for pressing another portion of said friction member against the shank of the shoe, and means for moving said pressing members rearwardly with respect to the last to cause the friction member to seat the forward portion of the shoe upon the last.

13. In a machine for effecting relative movement of lasts and shoes, a support for a last, a pad of flexible material adapted frictionally to engage a shoe, a plurality of supports for various portions respectively of said pad, a carrier for said pad supports, means for moving said carrier toward a shoe on a last on said last support to bring said pad into frictional engagement with the shoe, said pad supports being mounted upon said carrier for relative yielding movement with respect to each other to enable them to conform to the contour of the portion of the shoe engaged by said pad, means for moving said carrier relatively to the last in a direction to effect relative movement between the shoe and the last, a pair of driven cams, and operating connections between said cams and each of said carrier moving means respectively.

14. In a machine for effecting relative movement between lasts and shoes, a support for a last, a pad of flexible material adapted frictionally to engage a shoe, a carrier for said pad, a support for a portion of said pad mounted on said carrier, a lever adapted at one end to support another portion of said pad and pivotally connected at its other end upon said carrier, a spring interposed between said carrier and said lever enabling said lever to yield as the portion of the pad supported by said lever presses against a shoe, means for moving said carrier toward a shoe on a last on said last support to bring said pad into frictional engagement with the shoe, and means for moving said carrier relatively to the last in a direction to effect relative movement between the shoe and the last.

15. In a relasting machine, a support for a last partially inserted in a shoe, a pad of flexible material adapted frictionally to engage a shoe bottom, a plurality of supports for various portions respectively of said pad, a carrier for said pad supports, means for moving said carrier toward the bottom of a shoe on a last on said last support to bring said pad into frictional engagement with the shoe bottom, said pad supports being mounted upon said carrier for relative yielding movement with respect to each other to enable them to conform to the contour of the portion of the shoe bottom engaged by said pad, and means for moving said carrier rearwardly of the last to cause said pad to seat the forepart of the shoe upon the last.

16. In a relasting machine, a support for a last partially inserted in a shoe, a pad of rubber adapted frictionally to engage a shoe bottom, a support for one end of said rubber pad, a carrier for said pad support, a support for the other end of said pad resiliently mounted on said carrier, said pad supports being constructed and arranged upon movement of said carrier toward the bottom of a shoe on a last on said last support first to cause the second-mentioned pad support to bring a portion of the pad into frictional engagement with the shank of the shoe and then to cause the first-mentioned pad support to bring a portion of the pad into frictional engagement with the bottom of the forepart of the shoe, and operating means for said carrier constructed and arranged first to move the carrier toward the shoe bottom to bring the pad into frictional engagement with the shoe bottom and then to move rearwardly of the last to seat the forepart of the shoe upon the last.

17. In a machine for effecting relative movement of lasts and shoes, a support for a last, a blanket of flexible material adapted frictionally to engage a shoe bottom, means for supporting one portion of said blanket under pressure against the bottom of a shoe on a last on said last support, means independently yieldable with respect to said blanket supporting means for supporting another portion of said blanket under pressure against the shoe bottom, said blanket being secured to each of said blanket supporting means, and means for advancing said blanket supporting means lengthwise with respect to the last to move the shoe lengthwise relatively to the last.

18. In a relasting machine, a support for a last partially inserted in a shoe, a blanket of flexible material adapted frictionally to engage the bottom of a shoe on a last on said last support, a support for one end of said blanket, a carrier for said blanket support, a support for the other end of said blanket pivotally connected to said carrier to enable said other end of the blanket to swing toward the shoe bottom, spring means between the second-mentioned blanket support and said carrier for urging the second-mentioned blanket support toward the shoe bottom and for enabling the second-mentioned blanket support to yield relatively to the first-mentioned blanket support under pressure of the shoe bottom, and means for moving said carrier to cause both of said blanket supports to press the blanket against the shoe bottom and to advance the blanket rearwardly of the last, under pressure, to seat the forepart of the shoe upon the last.

19. In a relasting machine, a support for a last partially inserted in a shoe, a blanket of flexible material adapted frictionally to engage the bottom of a shoe on a last on said last support, a supporting member having a surface adapted to transmit pressure through a portion of said blanket against the shoe bottom, said blanket overlying said pressing surface and having one of its ends secured to said supporting member, a supporting member to which is secured the other end of said blanket, operating means constructed and arranged to cause both of said blanket supporting members to press said blanket against the shoe bottom and to urge said blanket rearwardly with respect to the last to seat the forepart of the shoe upon the last, and a pivotal connection between said operating means and the first-mentioned blanket supporting member to enable said pressing surface to tilt as occasioned by the inclination of the portion of the shoe bottom against which said pressing surface transmits pressure.

20. In a relasting machine, a support for a last partially inserted in a shoe, a blanket of flexible material adapted frictionally to engage the bottom of a shoe on a last on said last support, a supporting member having a surface adapted to transmit pressure through a portion of said blanket against the shoe bottom, said blanket overlying said pressing surface and having one of its ends secured to said supporting member, a supporting member to which is secured the other end of said blanket, operating means constructed and arranged to cause both of said blanket supporting members to press said blanket against the shoe bottom and to urge said blanket rearwardly with respect to the last to seat the forepart of the shoe upon the last, a pivotal connection between said operating means and the first-mentioned blanket supporting member to enable said pressing surface to tilt as occasioned by the inclination of the portion of the shoe bottom against which said pressing surface transmits pressure, and means for limiting the tilting movement of the first-mentioned supporting member under the influence of tension in said blanket.

21. In a relasting machine, a support for a last partially inserted in a shoe, a blanket of flexible material adapted frictionally to engage a shoe bottom, a supporting member having a surface adapted to transmit pressure through a portion of said blanket against the bottom of a shoe on a last on said last support, said blanket overlying said pressing surface and having one of its ends secured to said supporting member, a supporting lever to which is secured the other end of said blanket, operating means constructed and arranged to cause said blanket supporting member and said blanket supporting lever to press said blanket against the shoe bottom and to urge said blanket rearwardly with respect to the last to seat the forepart of the shoe upon the last, a pivotal connection between said operating means and the blanket supporting member to enable said pressing surface to tilt as occasioned by the inclination of the portion of the shoe bottom against which said pressing surface transmits pressure, said blanket supporting lever being fulcrumed upon said operating means to enable the lever to swing toward the shoe bottom, and resilient means pivoted about the axis of said pivotal connection and connected to said lever for urging said lever toward the shoe bottom and for enabling said lever to yield relatively to the blanket support under pressure of the shoe bottom.

22. In a machine for effecting relative movement of lasts and shoes, a support for a last, a plurality of members mounted for movement relatively to one another, means carried by each of said relatively movable members for engaging the bottom of a shoe on a last on said last support, and means for operating said relatively movable members to cause said shoe bottom-engaging means to move the shoe relatively to the last.

23. In a machine for effecting relative movement of lasts and shoes, a support for a last, a pair of members padded for frictional engagement with a shoe bottom, and means for causing said padded members to exert pressure against the bottom of a shoe on a last on said last support and to advance in a direction lengthwise of the last to move the shoe relatively to the last, one of said members being mounted on said advancing means for relative yielding movement with respect to the other member under pressure of the shoe bottom.

24. In a relasting machine, a support for a last partially inserted in a shoe, a pair of members padded for frictional engagement with a shoe bottom, supporting means for said padded members constructed and arranged to cause said padded members to exert pressure against the bottom of a shoe on a last on said last support, a resilient connection between one of said padded members and said supporting means for enabling that member to yield relatively to the other member under pressure of the shoe bottom, and means for advancing said supporting means in a direction which is rearward with respect to the last to seat the forepart of the shoe upon the last.

25. In a relasting machine, a support for a last partially inserted in a shoe, a member padded for frictional engagement with a considerable portion of the bottom of a shoe on a last on said last support, another member padded for frictional engagement with a different portion of the shoe bottom, means for causing said padded members to exert pressure against the shoe bottom and to advance rearwardly with respect to the last to seat the forepart of the shoe upon the last, and a pivotal connection between the first-mentioned padded member and said advancing means to enable the first-mentioned padded member to tilt as occasioned by the inclination of that portion of the shoe bottom which it engages.

26. In a machine for effecting relative movement between lasts and shoes, a support for a last, a member frictionally engageable with a shoe, a carrier for said friction member, means for moving said carrier to bring said friction member into operative engagement with a shoe on a last on said last support, and means for moving said carrier to cause said friction member while in operative engagement with the shoe to exert a frictional force upon the shoe tending to move the shoe lengthwise relatively to the last, said carrier constituting a link connection between the two carrier-moving means.

27. In a relasting machine, a support for a last partially inserted in a shoe, a friction pad, a carrier for said friction pad, means for moving said carrier to bring said friction pad into operative engagement with the bottom of a shoe on a last on said last support, and means for moving said carrier to cause said friction pad while in operative engagement with the shoe bottom to move the shoe rearwardly with respect to the last to seat the forepart of the shoe upon the last, said carrier constituting a link connection between the two carrier-moving means.

28. In a relasting machine, a support for a last partially inserted in a shoe, a friction pad, a carrier for said friction pad, means for moving said carrier to bring said friction pad into operative engagement with the bottom of a shoe on a last on said last support, said friction pad having a rigid backing tiltably mounted on said carrier to enable the pad to accommodate the inclination of the shoe bottom, and means for moving said carrier to cause said friction pad to move the shoe rearwardly with respect to the last to seat the forepart of the shoe upon the last, said carrier constituting a link connection between the two carrier-moving means.

29. In a relasting machine, a support for a last partially inserted in a shoe, a pair of links pivotally connected to each other, a friction pad supported by said links, means pivotally connected to one of said links for causing said pad to press against the bottom of a shoe on a last on said last support, and means pivotally connected to the other of said links for urging said pad rearwardly of the shoe to seat the forepart of the shoe upon the last.

30. In a relasting machine, a support for a last partially inserted in a shoe, a pair of links, a pivotal connection between said links, a friction pad having a rigid backing mounted upon said pivotal connection for free tilting movement with respect to each of said links, means pivotally connected to one of said links for causing said pad to press against the bottom of a shoe on a last on said last support, and means pivotally connected to the other of said links for urging said pad rearwardly of the shoe to seat the forepart of the shoe upon the last.

31. In a machine for effecting relative movement between lasts and shoes, a support for a last, a pair of links pivotally connected to each other, a friction member supported by said links, means pivotally connected to one of said links for causing said friction member to press against a shoe on a last on said last support, and means pivotally connected to the other of said links for moving said friction member to cause relative movement between the shoe and the last.

32. In a machine for effecting relative movement between lasts and shoes, a support for a last, a member frictionally engageable with a shoe, a pair of driven cams, and operating connections between each cam and said friction member, one of said cams together with its operating connections being constructed and arranged to bring said friction member into engagement with a shoe on a last on said last support and to maintain the friction member in engagement with the shoe, and the other of said cams together with its operating connections being constructed and arranged to move said friction member relatively to the last in a direction to cause said friction member to move the shoe relatively to the last.

33. In a relasting machine, a support for a last partially inserted in a shoe, a friction pad, a pair of driven cams, and operating connections between each cam and said friction pad, one of said cams together with its operating connections being constructed and arranged to bring said friction pad into engagement with the bottom of a shoe on a last on said last support and to maintain the pad pressed against the shoe bottom, and the other of said cams together with its operating connections being constructed and arranged to move said friction pad rearwardly with respect 34. In a relasting machine, a support for a last partially inserted in a shoe, a friction pad, a driven shaft, a pair of cams mounted in fixed relation to each other upon said shaft, and operating connections between each cam and said friction pad, one of said cams together with its operating connections being constructed and arranged to bring said friction pad into engagement with the bottom of a shoe on a last on said last support and to maintain the pad pressed against the shoe bottom, and the other of said cams together with its operating connections being constructed and arranged to move said friction pad rearwardly of the last while the friction pad is held pressed against the shoe bottom to seat the forepart of the shoe upon the last.

35. In a relasting machine, a support for a last partially inserted in a shoe, a pair of links pivotally connected to each other, a friction pad supported by said links, a pair of driven cams for operating said links respectively, and operating connections between each cam and the link driven by that cam, one of said links together with its cam and operating connections being constructed and arranged to bring said pad into engagement with the bottom of a shoe on a last mounted on said last support and to maintain the pad pressed against the shoe bottom, and the other of said links together with its cam and operating connections being constructed and arranged to move the pad rearwardly of the last to seat the forepart of the shoe upon the last.

36. In a relasting machine, a support for a last partially inserted in a shoe, a pair of links pivotally connected to each other, a friction pad supported by said links, a driven cam shaft, a pair of cams mounted in fixed relation to each other upon said shaft, an operating connection between one of said cams and one of said links, and an operating connection between the other cam and the other link, one of said links together with its cam and operating connection being constructed and arranged to bring said pad into engagement with the bottom of a shoe on a last carried by said support and to maintain the pad pressed against the shoe bottom, and the other of said links together with its cam and operating connection being constructed and arranged to move the pad rearwardly of the last while the pad is held pressed against the shoe bottom to seat the forepart of the shoe upon the last.

37. In a relasting machine, a support for a last partially inserted in a shoe, a pair of levers, a fixed fulcrum for each of said levers, a pair of links pivotally connected respectively to said levers and pivotally connected to each other, a friction pad supported by said links, means for urging one of said levers in a direction to cause the link connected to that lever to press said pad against the bottom of a shoe on a last on said last support and to maintain the pad pressed against the shoe bottom, and means for urging the other of said levers in a direction to cause the link connected to that lever to urge the pad rearwardly of the last while in frictional engagement with the shoe bottom to seat the forepart of the shoe upon the last.

38. In a relasting machine, a support for a last partially inserted in a shoe, a pair of levers, a fixed fulcrum for each of said levers, a pair of links pivotally connected respectively to said levers and pivotally connected to each other, a friction pad supported by said links, one of said levers and the link connected thereto being constructed and arranged to transmit movement to said pad to bring the pad into engagement with the bottom of a shoe on a last on said last support and to maintain the pad pressed against the shoe bottom, the other of said levers and the link connected thereto being constructed and arranged to transmit movement to the pad in a direction rearwardly of the last to seat the forepart of the shoe upon the last, and means for operating said levers in timed relation.

39. In a machine for effecting relative movement of lasts and shoes, a support for a last, a friction member constructed and arranged to engage the instep of a shoe on a last on said last support, and means for moving said instep-engaging member in a direction having a component lengthwise of the last to cause said member to exert upon the shoe a frictional force tending to move the shoe relatively to the last, said moving means including a spring constructed and arranged to press said friction member downwardly, relatively to the shoe, against the shoe.

40. In a relasting machine, a stationary support for a last partially inserted in a shoe, a friction member constructed and arranged to engage the instep of a shoe on a last on said last support, resilient means for pressing said instep-engaging member downwardly, relatively to the shoe, against the instep of the shoe, and means for moving said instep-engaging member rearwardly with respect to the last to cause said member to exert upon the shoe a frictional force tending to move the shoe relatively to the last.

41. In a relasting machine, a stationary support for a last partially inserted in a shoe, a frictional shoe engaging member movable rearwardly of a last on said support against the instep portion of a shoe on the last to exert a frictional force tending to seat the forepart of the shoe upon the last, means engageable with another portion of the shoe for urging the shoe upon the last, and means for operating said shoe-engaging member and said shoe-engaging means in timed relation to each other.

42. In a machine for effecting relative movement between lasts and shoes, a support for a last, a pair of members engageable with a shoe on a last carried by said last support, a carrier for each of said shoe-engageable members, each of said carriers being constructed and arranged for movement of its shoe-engageable member independently of the other shoe engageable-member, and means for moving said carriers to bring said shoe-engageable members into engagement, respectively, with the upper of the forepart of the shoe and with the bottom of the shoe, and thereupon to cause said shoe-engageable members to exert upon the shoe forces directed to move the shoe relatively to the last.

43. In a machine for effecting relative movement between lasts and shoes, a support for a last, a pair of members engageable with a shoe on a last carried by said last support, and means for operating said shoe-engaging members, said operating means being constructed and arranged first to move said shoe-engaging members along differently directed paths into engagement with the upper of the forepart of the shoe and with the bottom of the shoe respectively, thereby enabling said shoe-engaging members to press independently of each other against the shoe, and then to move said shoe-engaging members while in engagement with the shoe in a direction to move the shoe relatively to the last.

44. In a relasting machine, a relatively stationary support for a last partially inserted in a shoe, a pair of members frictionally engageable with the shoe on the last on said last support, and means for operating said shoe-engaging members, said operating means being constructed and arranged to move one of said shoe-engaging members toward the other shoe-engaging member and into frictional engagement with the shoe bottom, to move the other shoe-engaging member into engagement with the forepart of the shoe upper, and to move both shoe-engaging members rearwardly of said last while in frictional engagement with the shoe to seat the forepart of the shoe upon the last.

45. In a relasting machine, a support for a last partially inserted in a shoe, a pair of frictional shoe-engaging members, and means for moving said shoe-engaging members into frictional engagement with the upper of the forepart of a shoe on a last on said last support and with the bottom of the shoe respectively and for moving said members rearwardly of said last while in frictional engagement with the shoe to seat the forepart of the shoe upon the last, said shoe-engaging members being constructed and arranged for relative yielding movement with respect to each other as they bear against the shoe.

46. In a relasting machine, a support for a last partially inserted in a shoe, a frictional shoe-engaging member, means for moving said shoe-engaging member rearwardly of a last on said support against the instep portion of a shoe on the last to exert a frictional force tending to seat the forepart of the shoe upon the last, a resilient connection between said shoe-engaging member and said moving means constructed and arranged to enable said shoe-engaging member to yield upwardly with respect to the shoe as it is moved rearwardly, and means engageable with another portion of the shoe constructed and arranged to co-operate with said instep-engageable member in urging the shoe upon the last.

47. In a machine for effecting relative movements of lasts and shoes, a support for a last, a roll frictionally engageable with a shoe on a last carried by said support, a support upon which said roll is rotatably mounted, means for advancing said roll support relatively to the last with said roll in engagement with a shoe on the last, and means for holding said roll against rotation during such advancing movement to cause said roll to exert a frictional force tending to move the shoe relatively to the last, said holding means being automatically releasable upon retraction of said roll support to permit said roll to rotate during the return movement of the roll support, thereby avoiding any tendency of the roll to move the shoe in the direction of said return movement.

48. In a relasting machine, a support for a last partially inserted in a shoe, a rubber roll frictionally engageable with a shoe on a last carried by said support, a support upon which said roll is rotatably mounted, means for moving said support to bring said roll into engagement with the upper of the forepart of the shoe on the last and to move said roll rearwardly of the last, and a pawl and ratchet for holding said roll against rotation during said rearward movement to cause said roll to exert a rearwardly directed frictional force tending to seat the forepart of the shoe upon the last, said pawl and ratchet being releasable to permit the roll to rotate idly upon return movement of said roll.

49. In a relasting machine, a support for a last partially inserted in a shoe, a roll frictionally engageable with a shoe on a last carried by said support, a support upon which said roll is rotatably mounted, means for moving said support to bring said roll into engagement with the upper of the forepart of the shoe and to move said roll rearwardly of the last, a resilient connection between said roll support and said moving means constructed and arranged to yield under the pressure of the shoe against the roll, and means for restraining said roll from rotation during the rearward movement of the roll to cause said roll to exert a frictional force tending to seat the forepart of the shoe upon the last, said restraining means being automatically releasable to permit said roll to rotate idly during its return movement to avoid tending to unseat the forepart of the shoe during the return movement of the roll.

50. In a relasting machine, a support for a last partially inserted in a shoe, three members constructed and arranged to engage three separated portions respectively of a shoe on a last on said last support and to exert forces tending to seat the shoe upon the last, and means constructed and arranged to operate each of said shoe-engaging members in timed relation to the others to cause all of said shoe-engaging members to co-operate to seat the shoe upon the last.

51. In a relasting machine, a support for a last partially inserted in a shoe, means frictionally engageable with the upper of the forepart of a shoe on a last on said last support to urge the shoe rearwardly upon the last, means frictionally engageable with the shoe bottom to urge the shoe rearwardly upon the last, means for drawing the heel portion of the shoe upon the last, and cam operated means for operating said upper-engageable, said bottom-engageable and said heel-drawing means in timed relation to each other to seat the shoe upon the last.

52. In a relasting machine, a support for a last partially inserted in a shoe, a friction member constructed and arranged to engage the instep of a shoe on a last on said last support, a friction member constructed and arranged to engage the shoe bottom, means for moving said friction members while in engagement with the shoe rearwardly with respect to the last to cause said friction members to seat the forepart of the shoe upon the last, and means for seating the heel portion of the shoe upon the last.

53. In a relasting machine, a support for a last partially inserted in a shoe, a friction member constructed and arranged to engage the instep of a shoe on a last on said last support and to be moved rearwardly with respect to the last, a friction member constructed and arranged to engage the bottom of the shoe and to be moved rearwardly wtih respect to the last, said friction members co-operating with each other to seat the forepart of the shoe upon the last, means for seating the heel portion of the shoe upon the last, and means for operating each of said friction members and said heel portion seating means in timed relation to one another.

54. In a relasting machine, a support for a last partially inserted in a shoe, a friction member constructed and arranged to engage the instep of a shoe on a last on said last support, a friction member constructed and arranged to engage the shoe bottom, means for moving said friction members while in engagement with the shoe rearwardly with respect to the last to cause said friction members to seat the forepart of the shoe upon the last, a movable shoe horn adapted to engage the interior of the upper of the heel portion of the shoe, said horn being formed of two portions which are pivotally connected for swinging movement relatively to each other about an axis which extends lengthwise of the horn to enable said horn to conform to the shape of the heel portion of the shoe, a member constructed and arranged to engage the exterior of the upper of the heel portion of the shoe and to constitute an exterior clamping jaw co-operating with said shoe horn, and means for causing said horn and said exterior clamping jaw to grip between them the upper of the heel end of the shoe and to draw the heel end of the shoe upon the last.

55. In a relasting machine, a support for a last partially inserted in a shoe, a friction member constructed and arranged to engage the instep of a shoe on a last on said last support, a friction member constructed and arranged to engage the shoe bottom, means for moving said friction members while in engagement with the shoe rearwardly with respect to the last to cause said friction members to seat the forepart of the shoe upon the last, a movable shoe horn adapted to engage the interior of the upper of the heel portion of the shoe, said horn being formed of two portions which are pivotally connected for swinging movement relatively to each other about an axis which extends lengthwise of the horn to enable the horn to conform to the shape of the heel portion of the shoe, resilient means for urging said horn members apart from each other to cause them to press outwardly against the interior of the shoe upper, a member constructed and arranged to engage the exterior of the upper of the heel portion of the shoe and to constitute an exterior clamping jaw co-operating with said shoe horn, said exterior clamping jaw being formed of two portions which are pivotally connected for swinging movement relatively to each other in a manner similar to that of the two portions of the shoe horn to enable said exterior clamping jaw to conform to the shape of the exterior of the heel portion of the shoe upper, means for urging the two clamping jaw members toward each other to cause them to bear inwardly against the shoe, and means for causing said horn and said clamping jaw to grip between them the upper of the heel end of the shoe and to draw the heel end of the shoe upon the last.

HAROLD S. PYM.
JOHN M. WHELTON.